United States Patent
Nakagawa et al.

(10) Patent No.: US 12,546,063 B2
(45) Date of Patent: Feb. 10, 2026

(54) METHOD FOR CONTROLLING DECOMPOSITION OF CORROSION-RESISTANT PAPER

(71) Applicant: Nippon Beet Sugar Manufacturing Co., Ltd., Tokyo (JP)

(72) Inventors: Takuya Nakagawa, Obihiro (JP); Yasuomi Ota, Obihiro (JP); Yoshiaki Okuhama, Akashi (JP); Seiichiro Nakao, Akashi (JP)

(73) Assignee: NIPPON BEET SUGAR MANUFACTURING CO., LTD., Tokyo (JP)

( * ) Notice: Subject to any disclaimer, the term of this patent is extended or adjusted under 35 U.S.C. 154(b) by 249 days.

(21) Appl. No.: 18/042,829

(22) PCT Filed: Mar. 4, 2021

(86) PCT No.: PCT/JP2021/008531
§ 371 (c)(1),
(2) Date: Feb. 24, 2023

(87) PCT Pub. No.: WO2022/044387
PCT Pub. Date: Mar. 3, 2022

(65) Prior Publication Data
US 2024/0026610 A1 Jan. 25, 2024

(30) Foreign Application Priority Data
Aug. 25, 2020 (JP) ................................ 2020-141809

(51) Int. Cl.
| | |
|---|---|
| D21H 21/38 | (2006.01) |
| A01G 9/029 | (2018.01) |
| C09K 17/52 | (2006.01) |
| D21H 19/12 | (2006.01) |
| D21H 23/72 | (2006.01) |
| D21H 27/00 | (2006.01) |

(52) U.S. Cl.
CPC ........... *D21H 21/38* (2013.01); *A01G 9/0291* (2018.02); *C09K 17/52* (2013.01); *D21H 19/12* (2013.01); *D21H 23/72* (2013.01); *D21H 27/00* (2013.01)

(58) Field of Classification Search
CPC ........ D21H 21/38; D21H 19/12; D21H 23/72; D21H 27/00; D21H 17/14; D21H 17/64; D21H 23/78; D21H 5/141; A01G 9/0291; A01G 13/32; A01G 9/02; C09K 17/52
See application file for complete search history.

(56) References Cited

U.S. PATENT DOCUMENTS

| | | | |
|---|---|---|---|
| 4,610,761 A | 9/1986 | Eklund et al. | |
| 6,165,919 A | 12/2000 | Yang | |
| 12,104,326 B2 * | 10/2024 | Nakagawa | D21H 17/14 |
| 2003/0145517 A1 * | 8/2003 | Miller | A01C 1/044 |
| | | | 47/57.6 |
| 2005/0072542 A1 | 4/2005 | Sears et al. | |
| 2006/0286343 A1 * | 12/2006 | Curro | D04H 11/08 |
| | | | 428/172 |
| 2015/0368864 A1 | 12/2015 | Seger et al. | |
| 2018/0230279 A1 | 8/2018 | Banzashi et al. | |
| 2022/0333311 A1 * | 10/2022 | Nakagawa | D21H 25/02 |
| 2024/0026610 A1 * | 1/2024 | Nakagawa | D21H 17/14 |
| 2024/0357975 A1 * | 10/2024 | Choi | C09D 5/00 |

FOREIGN PATENT DOCUMENTS

| | | | | |
|---|---|---|---|---|
| CN | 116171342 B | * | 4/2024 | ............ D21H 17/64 |
| EP | 651088 A1 | * | 5/1995 | ............ B27N 1/00 |
| EP | 4026947 A1 | * | 7/2022 | ............ A01G 9/02 |
| EP | 4206401 A1 | * | 7/2023 | ............ A01G 9/02 |
| EP | 4455228 A1 | * | 10/2024 | ............ A01G 9/021 |
| EP | 4101642 B1 | * | 4/2025 | ............ A01G 9/0291 |
| EP | 4206401 B1 | * | 9/2025 | ............ D21H 27/00 |
| JP | 49-035138 A | | 4/1974 | |
| JP | 59-100793 A | | 6/1984 | |
| JP | 60-501317 A | | 8/1985 | |
| JP | 60-245129 A | | 12/1985 | |
| JP | 1990-023640 A | | 1/1990 | |
| JP | 09-205901 A | | 8/1997 | |
| JP | 11-46995 A | | 2/1999 | |
| JP | 2001-508139 A | | 6/2001 | |
| JP | 2004-121054 A | | 4/2004 | |
| JP | 2006342452 A | * | 12/2006 | |

(Continued)

OTHER PUBLICATIONS

Petri Widsten et al., in "Citric acid crosslinking of paper products for improved high-humidity performance," Carbohydrate Polymers 101 (2014) pp. 998-1004. (Year: 2014).*
International Search Report for corresponding International Application No. PCT/JP2021/008531 mailed May 11, 2021.
Written Opinion for corresponding International Application No. PCT/JP2021/008531 dated May 11, 2021.

*Primary Examiner* — Jose A Fortuna
(74) *Attorney, Agent, or Firm* — Chrisman Gallo Tochtrop LLC

(57) ABSTRACT

There is provided: a method for controlling corrosion-resistant paper with easy decomposability, whereby the paper has corrosion resistance against decomposition due to microorganisms in soil when raising seedlings, the paper retains satisfactory strength during agricultural planting, and desired decomposability is given to the paper after planting or after harvest of crops; and a method for producing corrosion-resistant paper with controlled decomposability. The controlling method is subjected to corrosion-resistant paper containing paper with cellulose fibers and a carboxylic acid crosslinking agent at least partially bonded to each other, the controlling method including a step for treating the corrosion-resistant paper with alkali; and the producing method comprises a step for applying a processing solution containing a carboxylic acid crosslinking agent to paper containing cellulose fibers, a step for subjecting the paper to a heating treatment, and a step for treating the paper undergone the heating treatment with an alkali.

8 Claims, 11 Drawing Sheets

(56) References Cited

FOREIGN PATENT DOCUMENTS

| | | | |
|---|---|---|---|
| JP | 2007-527472 A | 9/2007 | |
| JP | 4763123 B2 | 8/2011 | |
| JP | 2016-510366 A | 4/2016 | |
| JP | 2019-015000 A | 1/2019 | |
| KR | 10-2018-0037191 A | 4/2018 | |
| KR | 102751418 B1 * | 1/2025 | ............ D21H 19/12 |
| KR | 102778135 B1 * | 3/2025 | ............ D21H 19/12 |
| TW | I847019 B * | 7/2024 | ............ D21H 11/04 |
| WO | 2021/045205 A1 | 3/2021 | |

\* cited by examiner

FIG. 1-1
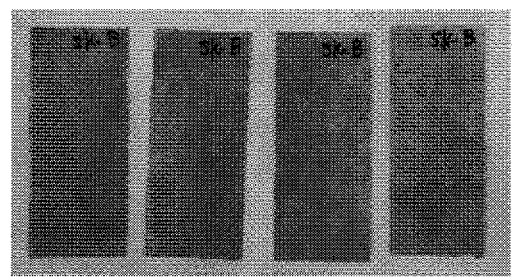
[A]
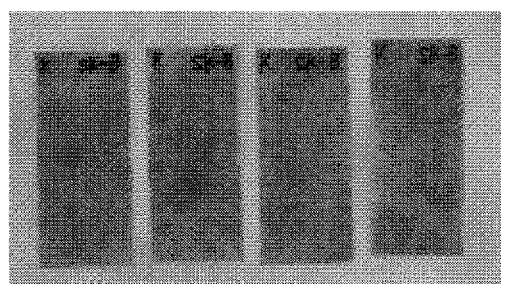
[B]
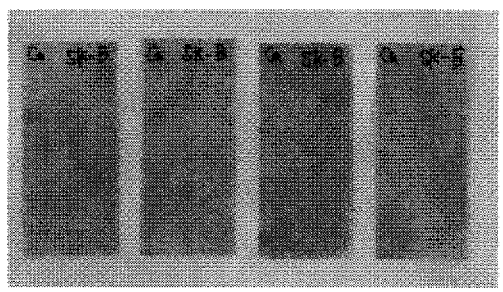
[C]
FIG. 1-2
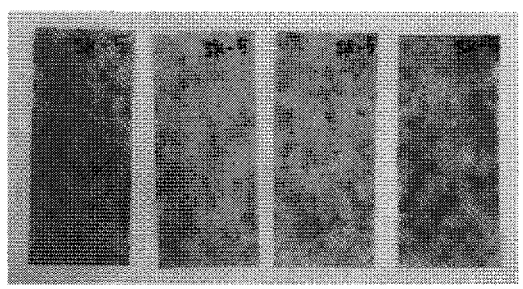
[A]
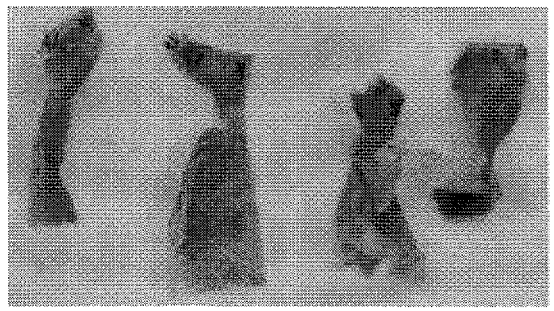
[B]
[C]

FIG. 1-3
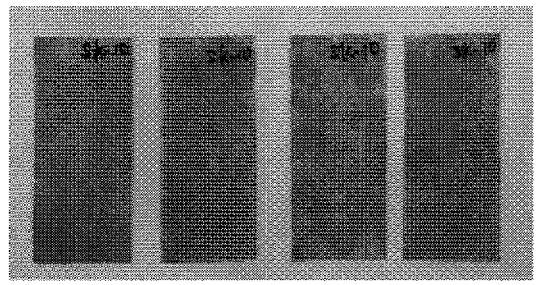
[A]
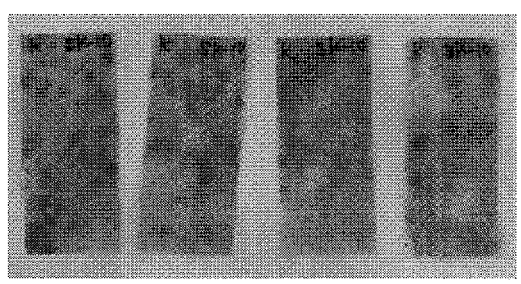
[B]
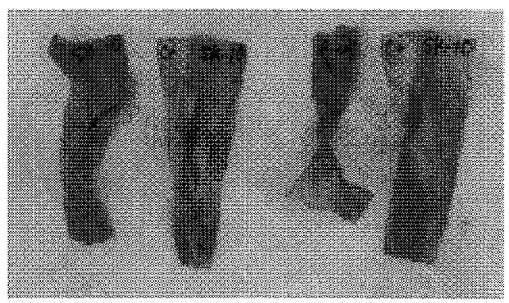
[C]
FIG. 1-4
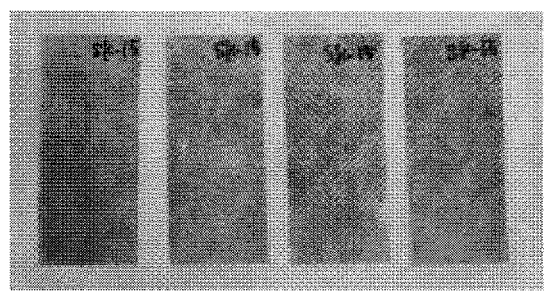
[A]
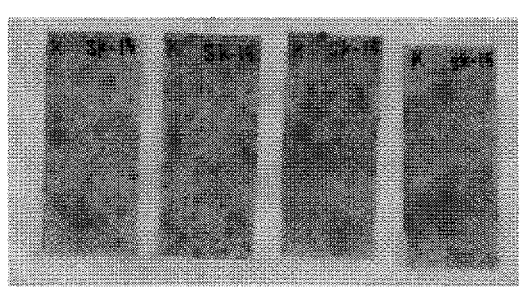
[B]
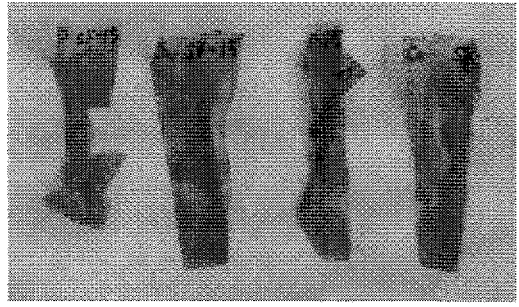
[C]

FIG. 2-1
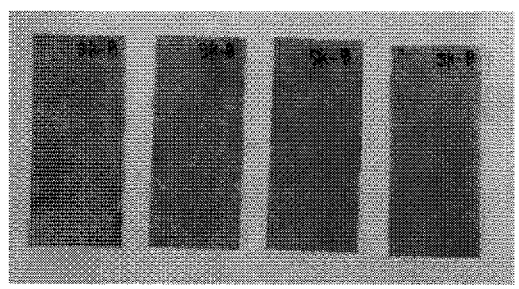
[A]
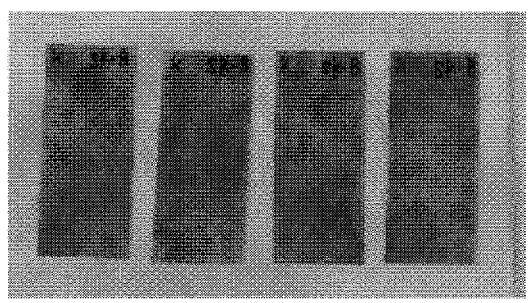
[B]
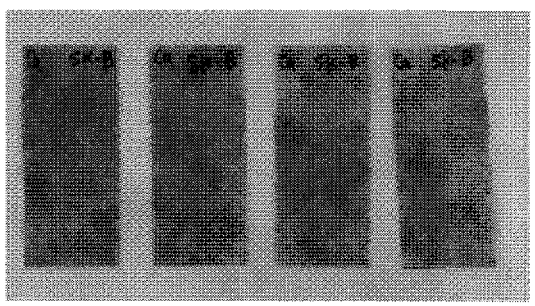
[C]
FIG. 2-2
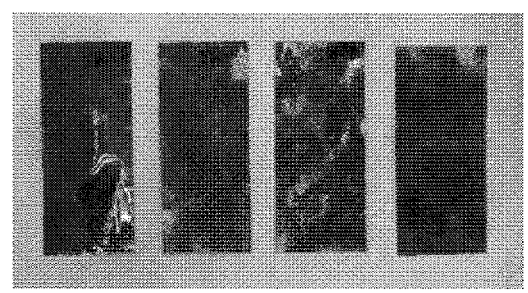
[A]
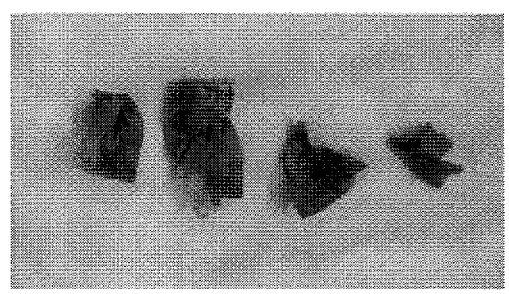
[B]
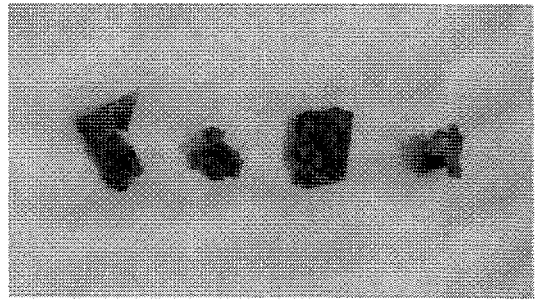
[C]

FIG. 2-3
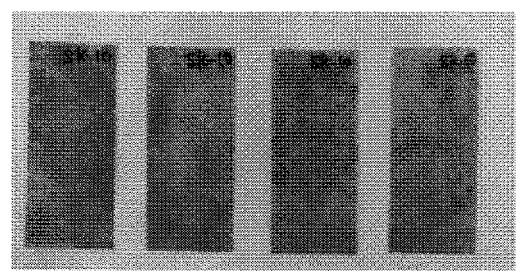
[A]
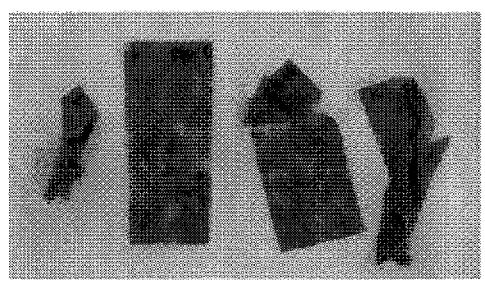
[B]
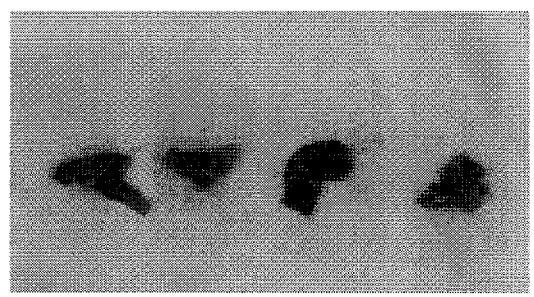
[C]
FIG. 2-4
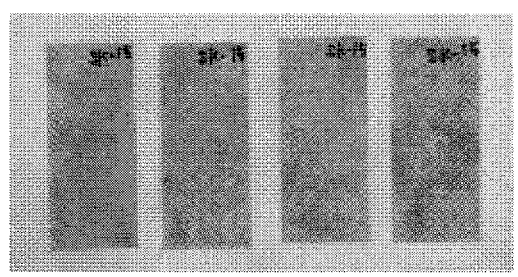
[A]
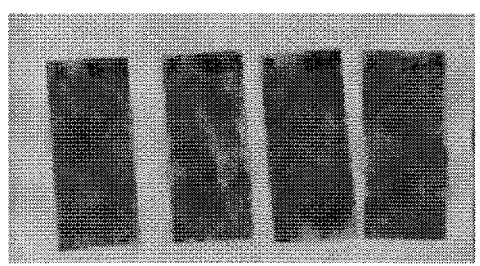
[B]
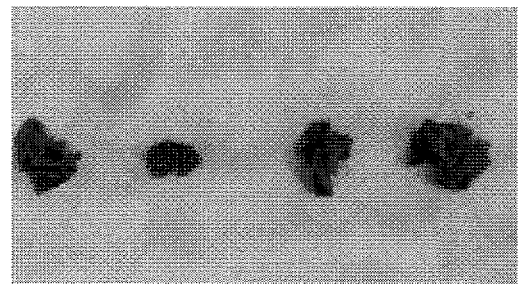
[C]

FIG. 3-1
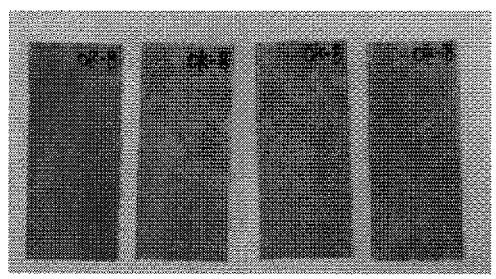
[A]
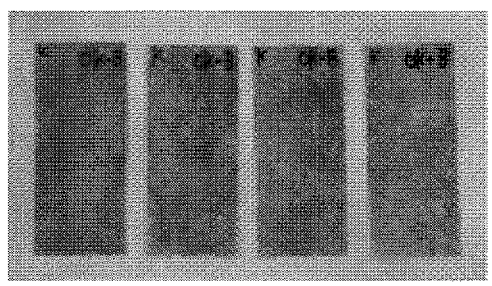
[B]
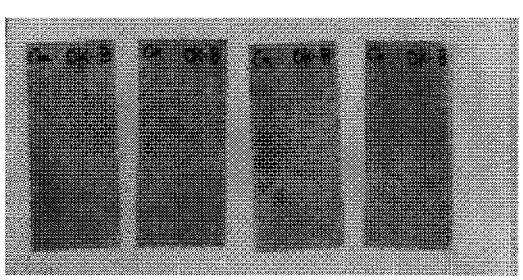
[C]
FIG. 3-2
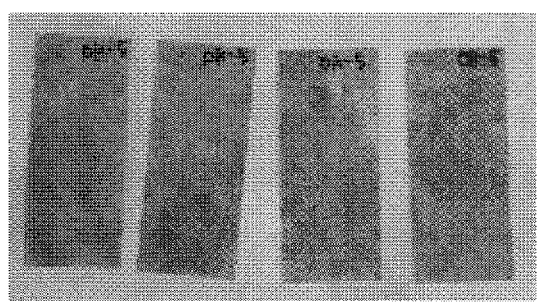
[A]
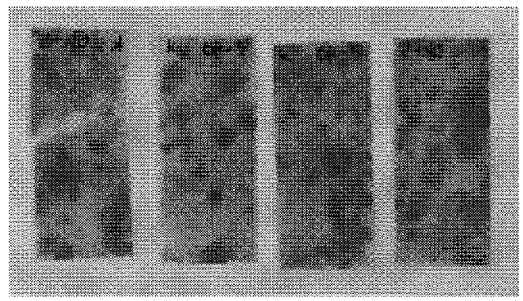
[B]
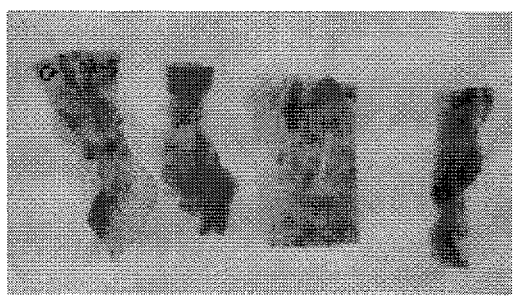
[C]

FIG. 3-3
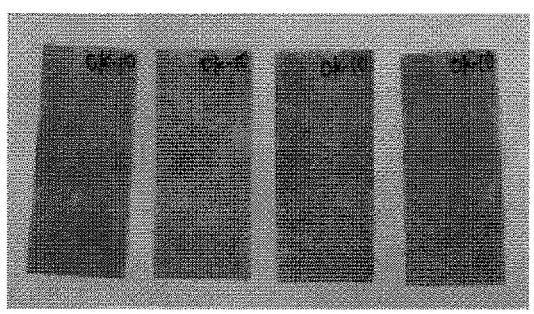
[A]
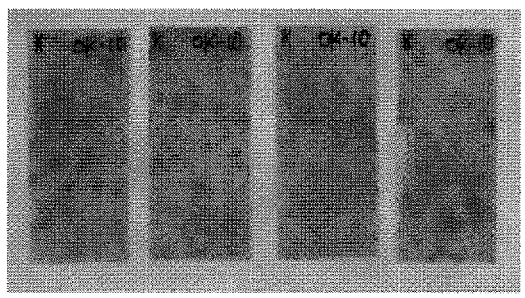
[B]
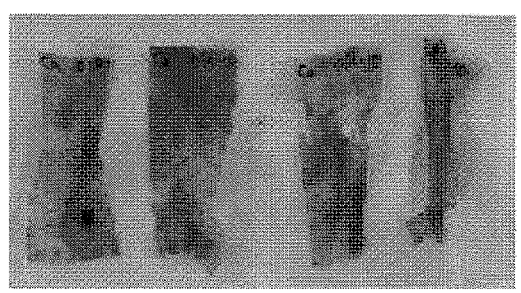
[C]
FIG. 3-4
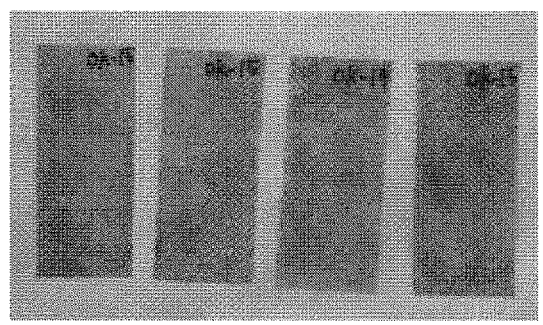
[A]
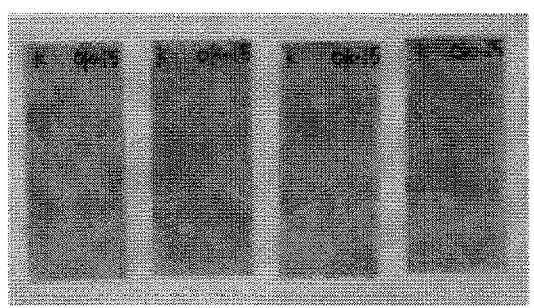
[B]
[C]

FIG. 4-1
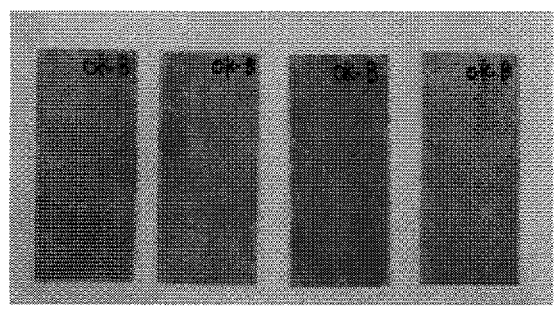
[A]
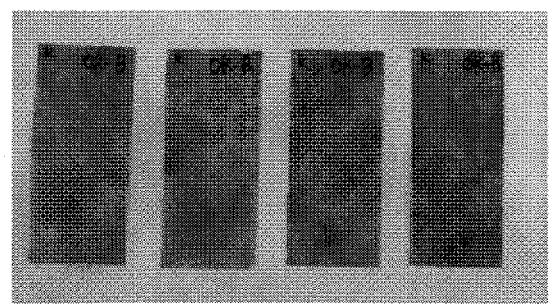
[B]
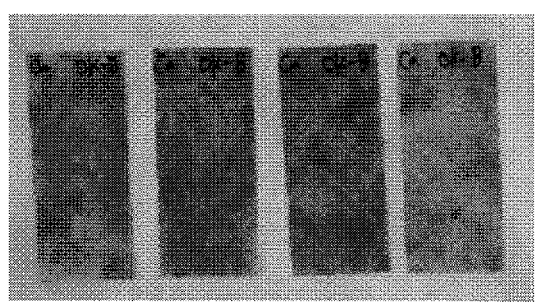
[C]
FIG. 4-2
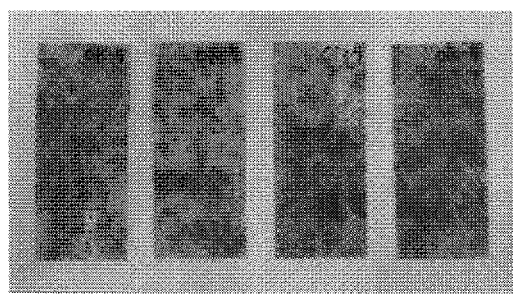
[A]
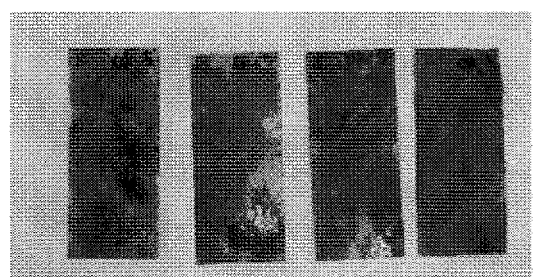
[B]
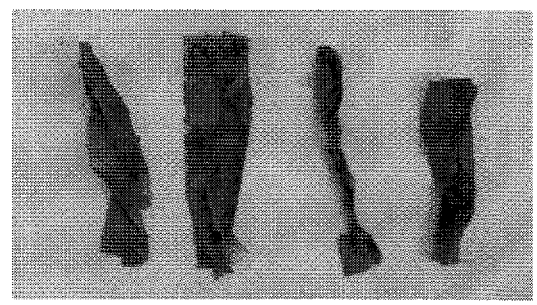
[C]

FIG. 4-3
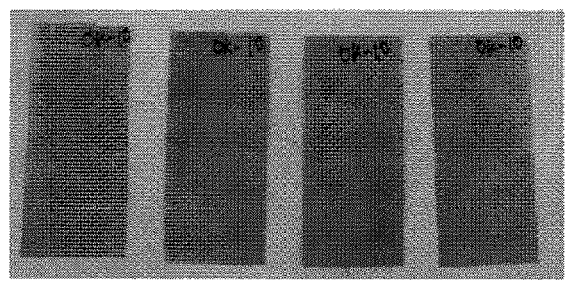
[A]
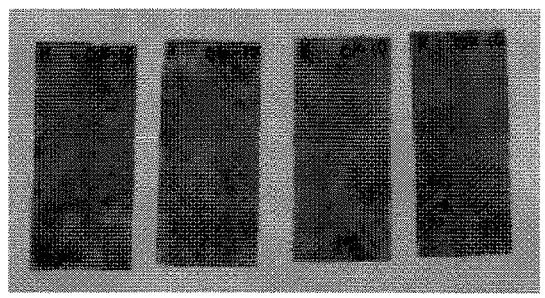
[B]
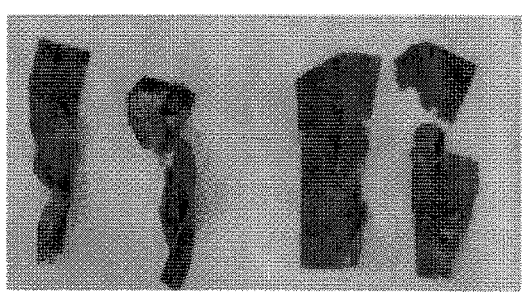
[C]
FIG. 4-4
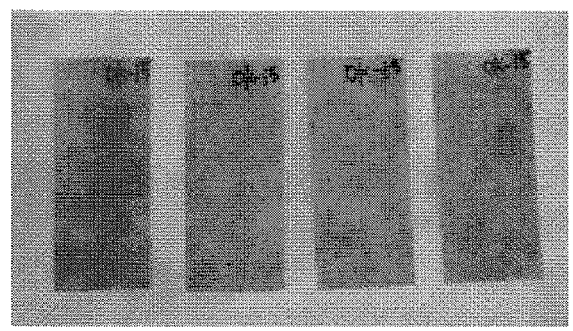
[A]
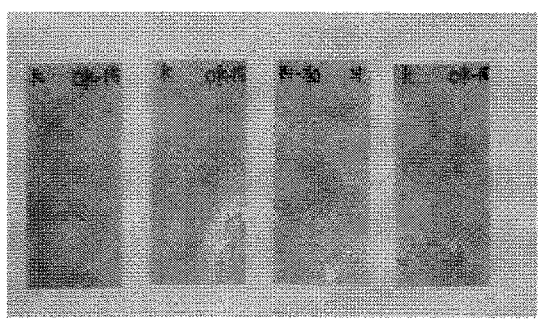
[B]
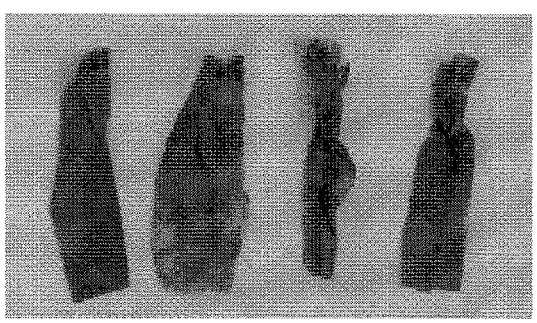
[C]

RAISING SEEDLING POT (a)

(b)

(a)

(b)

(a)

(b)

(a)

(b)

(a)

(b)

(a)

(b)

METHOD FOR CONTROLLING DECOMPOSITION OF CORROSION-RESISTANT PAPER

CROSS-REFERENCE TO RELATED APPLICATIONS

This application is a national stage entry of International Application No. PCT/JP2021/008531 filed on Mar. 4, 2021, which claims the benefit of priority to Japanese Application No. JP2020-141809, filed Aug. 25, 2020, the entire disclosures of which are hereby incorporated herein by reference.

TECHNICAL FIELD

The present invention relates to a method for achieving the compatibility between the corrosion resistance and easy degradability of a paper that can withstand corrosion for a certain period of time, i.e., a corrosion-resistant paper that can be used for, for example, agricultural materials, fishery materials, and building materials. Specifically, the present invention relates to a method for controlling the degradation of a corrosion-resistant paper, and a method for producing a corrosion-resistant paper having controlled degradability.

BACKGROUND ART

Conventionally, a seedling transplanting cultivation method has been widely put into practical use, wherein a plant is cultivated using a paper pot processed to have a quadrangular prism shape or a hexagonal prism shape. Specifically, this cultivation method involves charging culture soil into a quadrangular or hexagonal prism-shaped pot made of paper, seeding, growing seedlings under irrigation control, planting the thus-grown seedlings contained in the pot (i.e., seedlings in the pot) in the field, and cultivating the seedlings.

The main characteristic features required for the paper used for the pot used in the aforementioned seedling transplanting cultivation method (hereinafter the paper may be referred to as a "base paper for a raising seedling pot") are, for example, (1) having paper strength upon drying to such an extent as to withstand mechanical processing (e.g., bending and pulling) during production of a pot, (2) having resistance to degradation by microorganisms during raising seedlings (i.e., corrosion resistance) and having paper strength upon wetting so as to withstand mechanical or artificial handling during planting in the field, and (3) being easily degradable after planting in the field. Thus, the base paper for a raising seedling pot is required to have two contradictory properties; i.e., the property of suppressing the progress of degradation during raising seedlings and maintaining sufficient strength at the time of planting, and the property of rapidly degrading after planting in the field.

Various methods for processing a base paper for a raising seedling pot have been proposed for achieving the aforementioned requirements while taking advantage of paper characteristics.

For example, Patent Documents 1 and 2 disclose a method for providing paper with strength to withstand production of a pot, and corrosion resistance to such an extent as to withstand raising seedling conditions and to naturally degrade after transplanting, wherein the hydroxyl group of cellulose paper is chemically blocked through crosslinking by using a formaldehyde-based agent which is an N-substituted urea derivative such as dimethylol dihydroxyethylene urea (DMDHEU).

Patent Documents 3 and 4 propose a raising seedling pot produced from a layered sheet including a thermoplastic biodegradable resin layer disposed on a paper base, or a raising seedling pot produced on the basis of studies on the components of the biodegradable resin layer for controlling the degradation period, in order to maintain the shape and strength of the raising seedling pot during raising seedlings or during transplanting in the soil after raising seedlings, and to realize rapid degradation of the pot after planting in the field.

A mulch sheet to be laid on the soil surface of the field is used for achieving the effect of eradicating weeds or adjusting soil temperature (heat retention) during growth of target agricultural crops, etc., as well as the effects of, for example, retaining soil moisture, preventing soil erosion, preventing fertilizers from flowing out, and preventing the occurrence of diseases and pests. Such a mulch sheet has conventionally been formed from a chemical product such as a polyethylene film or a vinyl chloride film. However, since such a film has little biodegradability, the used film must be recovered and discarded after harvest of agricultural crops, etc. Therefore, proposals have been made for mulch sheets that reduce the burden on farmers and have less impact on the environment; specifically, paper mulch sheets that rot and degrade in the soil. For example, Patent Document 6 discloses a paper mulch sheet containing an antifungal agent and/or an antibacterial agent.

The main characteristic features required for the paper used in the aforementioned mulch sheet (hereinafter the paper may be referred to as a "base paper for agricultural coating material") are, for example, (i) paper strength upon drying to such an extent as to withstand mechanical processing during production of a mulch sheet, and to withstand stretching on the soil, (ii) resistance to degradation by soil microorganisms at portions that are in contact with the soil, and (iii) rapid degradability after use, like the case of a base paper for a raising seedling pot.

PRIOR ART DOCUMENTS

Patent Documents

Patent Document 1: JP 1984-100793 A
Patent Document 2: JP 1990-023640 A
Patent Document 3: JP 4763123 B
Patent Document 4: JP 2004-121054 A
Patent Document 5: JP 2001-508139 A
Patent Document 6: JP 1997-205901 A

SUMMARY OF THE INVENTION

Problems to be Solved by the Invention

According to the method disclosed in Patent Documents 1 and 2, the paper can be provided with sufficient corrosion resistance, but DMDHEU (i.e., formaldehyde-based agent) may contain a very small amount of formaldehyde, which requires consideration of impact on the environment. There has been disclosed a technique for improving a wetting performance (e.g., wrinkle recovery or strength) by using polycarboxylic acid as a crosslinking agent in place of a formaldehyde-based agent in order to block the hydroxyl group of cellulosic fiber through crosslinking (Patent Document 5). However, it has not yet been disclosed that such a technique can impart corrosion resistance (i.e., an important requirement for paper) to a base paper for a raising seedling pot used in the field of agriculture. Even if corrosion resistance is provided, there is no discussion about promoting the degradation of the paper after planting in the field.

Patent Documents 3 and 4 disclose a technique in which a thermoplastic biodegradable resin layer is applied to a raising seedling pot so that the raising seedling pot degrades after being planted in the field. However, no technique has been established for intentionally controlling the degradation of the pot during raising seedlings and after planting.

The paper mulch sheet described in Patent Document 6 is formed of only pulp fibers, and the mulch sheet has a limitation in controlling the biodegradation rate.

An object of the present invention is to provide a corrosion-resistant paper that achieves the compatibility between corrosion resistance and easy degradability; i.e., to provide a method capable of controlling the initiation of biodegradation. Specifically, an object of the present invention is to provide a method for controlling corrosion resistance, wherein the method can provide a paper with resistance to degradation by soil microorganisms (i.e., corrosion resistance) for a desired period of time, for example, during raising seedlings, and can also provide the paper with sufficient strength (paper strength) at the time of planting in the field, and desired degradability after planting in the field or after harvest of agricultural crops.

Means for Solving the Problems

In order to achieve the aforementioned object, the present inventors have conducted extensive studies, and as result have found that when the hydroxy group of cellulose fiber is blocked by using a polycarboxylic acid crosslinking agent that does not generate free formaldehyde in place of a conventional formaldehyde-based agent (DMDHEU), the resultant raising seedling paper (e.g., a base paper for a raising seedling pot or a base paper for agricultural coating material) can be provided with required corrosion resistance and exhibits a reduced burden on the environment, and have also found that the paper can be provided with easy degradability by alkali treatment.

Furthermore, the present inventors have conducted studies on conditions for reaction with a polycarboxylic acid crosslinking agent in more detail, and on conditions for alkali treatment in more detail, and have found that a paper can be provided with desired corrosion resistance and easy degradability corresponding to various conditions. The present invention has been accomplished on the basis of these findings.

Accordingly, the present invention provides the following embodiments (1) to (26).

(1) A method for controlling the degradation of a corrosion-resistant paper, the method comprising a step of alkali treatment of the corrosion-resistant paper, characterized in that the corrosion-resistant paper contains a cellulose fiber-containing paper and a carboxylic acid crosslinking agent, and the cellulose fiber is at least partially bonded to the carboxylic acid crosslinking agent.

(2) The method according to (1), wherein the method comprises a step of alkali treatment of the corrosion-resistant paper with a solution having a pH of 9 or more.

(3) The method according to (1), wherein the alkali treatment is performed with at least one basic substance selected from the group consisting of sodium hydroxide, potassium hydroxide, calcium hydroxide, sodium hydrogen carbonate, sodium carbonate, potassium carbonate, calcium carbonate, lithium hydroxide, rubidium hydroxide, cesium hydroxide, tetramethylammonium hydroxide, tetraethylammonium hydroxide, strontium hydroxide, barium hydroxide, europium hydroxide, thallium hydroxide, diamminesilver(I) hydroxide, tetraamminecopper(II) hydroxide, trimethylsulfonium hydroxide, diphenyliodonium hydroxide, ammonium carbonate, barium carbonate, magnesium carbonate, lithium carbonate, silver(I) carbonate, iron (II) carbonate, copper(II) carbonate, quicklime, calcium silicate, magnesia lime, calcium sulfate, and lime nitrogen, or alkaline electrolyzed water.

(4) The method according to any one of (1) to (3), characterized in that the carboxylic acid crosslinking agent is at least one compound selected from the group consisting of dicarboxylic acids, polycarboxylic acids, and salts of these.

(5) The method according to any one of (1) to (4), characterized in that the carboxylic acid crosslinking agent is at least one compound selected from the group consisting of citric acid, butanetetracarboxylic acid, iminodisuccinic acid, maleic acid, fumaric acid, oxalic acid, malonic acid, succinic acid, adipic acid, and salts of these.

(6) The method according to any one of (1) to (5), characterized in that the carboxylic acid crosslinking agent is contained in an amount of 0.3 to 20.0% by mass relative to the dry mass of the cellulose fiber-containing paper.

(7) The method according to any one of (1) to (6), characterized in that the corrosion-resistant paper further contains at least one crosslinking catalyst selected from the group consisting of sodium hypophosphite, potassium hypophosphite, and disodium hydrogenphosphate.

(8) The method according to (7), characterized in that the crosslinking catalyst is contained in an amount of 0.1 to 30% by mass relative to the mass of the carboxylic acid crosslinking agent.

(9) A method for producing a corrosion-resistant paper having controlled degradability, the method comprising:
a step of applying a processing liquid containing a carboxylic acid crosslinking agent to a cellulose fiber-containing paper;
a step of thermally treating the processing liquid-applied paper; and
a step of alkali treatment of the thermally treated paper.

(10) The method according to (9), wherein the method comprises a step of alkali treatment of the thermally treated paper with a solution having a pH of 9 or more.

(11) The method according to (9), wherein the alkali treatment is performed with at least one basic substance selected from the group consisting of sodium hydroxide, potassium hydroxide, calcium hydroxide, sodium hydrogen carbonate, sodium carbonate, potassium carbonate, calcium carbonate, lithium hydroxide, rubidium hydroxide, cesium hydroxide, tetramethylammonium hydroxide, tetraethylammonium hydroxide, strontium hydroxide, barium hydroxide, europium hydroxide, thallium hydroxide, diamminesilver(I) hydroxide, tetraamminecopper(II) hydroxide, trimethylsulfonium hydroxide, diphenyliodonium hydroxide, ammonium carbonate, barium carbonate, magnesium carbonate, lithium carbonate, silver(I) carbonate, iron (II) carbonate, copper(II) carbonate, quicklime, calcium silicate, magnesia lime, calcium sulfate, and lime nitrogen, or alkaline electrolyzed water.

(12) The method according to any one of (9) to (11), characterized in that the carboxylic acid crosslinking agent is at least one compound selected from the group consisting of dicarboxylic acids, polycarboxylic acids, and salts of these.

(13) The method according to any one of (9) to (12), characterized in that the carboxylic acid crosslinking agent is at least one compound selected from the group consisting of citric acid, butanetetracarboxylic acid, iminodisuccinic acid, maleic acid, fumaric acid, oxalic acid, malonic acid, succinic acid, adipic acid, and salts of these.

(14) The method according to any one of (9) to (13), characterized in that the processing liquid contains the carboxylic acid crosslinking agent at a concentration of 1.0 to 20.0% by mass.

(15) The method according to any one of (9) to (14), characterized in that the thermal treatment is performed in an atmosphere having a temperature of 30 to 300° C.

(16) The method according to any one of (9) to (14), characterized in that the thermal treatment is performed in an atmosphere having a temperature of 150 to 220° C.

(17) The method according to any one of (9) to (14), characterized in that the thermal treatment is performed by contact heating with a heating roll and/or a heating plate.

(18) The method according to (17), characterized in that the temperature of a portion at which the processing liquid-applied paper comes into contact with the heating roll and/or the heating plate is 150 to 250° C.

(19) The method according to (17), characterized in that the temperature of a portion at which the processing liquid-applied paper comes into contact with the heating roll and/or the heating plate is 190 to 220° C.

(20) The method according to any one of (9) to (19), characterized in that the processing liquid further contains at least one crosslinking catalyst selected from the group consisting of potassium hypophosphite and disodium hydrogenphosphate.

(21) The method according to (20), characterized in that the processing liquid contains the crosslinking catalyst in an amount of 0.1 to 30% by mass relative to the mass of the carboxylic acid crosslinking agent.

(22) The method according to any one of (1) to (8), wherein the corrosion-resistant paper is a base paper for a raising seedling pot.

(23) The method according to any one of (9) to (21), wherein the corrosion-resistant paper is a base paper for a raising seedling pot.

(24) A method for producing a raising seedling pot, the method comprising using a base paper for a raising seedling pot produced by the method according to (23).

(25) The method according to any one of (1) to (8), wherein the corrosion-resistant paper is a base paper for an agricultural paper mulch sheet.

(26) The method according to any one of (9) to (21), wherein the corrosion-resistant paper is a base paper for an agricultural paper mulch sheet.

Effects of the Invention

The present invention can provide a corrosion-resistant paper exhibiting a reduced burden on the environment by using a carboxylic acid crosslinking agent for crosslinking of cellulose in place of a formaldehyde-based agent (DMDHEU), and performing alkali treatment after crosslinking processing. According to the present invention, the corrosion-resistant paper can be provided with sufficient strength during raising seedlings and at the time of planting in the field or during growth of agricultural crops, and can also be provided with desired degradability (i.e., promoted degradation) after planting in the field and after harvest of agricultural crops.

BRIEF DESCRIPTION OF THE DRAWINGS

FIG. 1-1 is photographs of DMDHEU-crosslinked base papers formed from base paper 2 that were treated by contact heating, and then subjected to [A] non-treatment, [B] alkali treatment (h), or [C] alkali treatment (j), followed by burial for two weeks and subsequent development.

FIG. 1-2 is photographs of 5% citric acid-crosslinked base papers formed from base paper 2 that were treated by contact heating, and then subjected to [A] non-treatment, [B] alkali treatment (h), or [C] alkali treatment (j), followed by burial for two weeks and subsequent development.

FIG. 1-3 is photographs of 10% citric acid-crosslinked base papers formed from base paper 2 that were treated by contact heating, and then subjected to [A] non-treatment, [B] alkali treatment (h), or [C] alkali treatment (j), followed by burial for two weeks and subsequent development.

FIG. 1-4 is photographs of 15% citric acid-crosslinked base papers formed from base paper 2 that were treated by contact heating, and then subjected to [A] non-treatment, [B] alkali treatment (h), or [C] alkali treatment (j), followed by burial for two weeks and subsequent development.

FIG. 2-1 is photographs of DMDHEU-crosslinked base papers formed from base paper 2 that were treated by contact heating, and then subjected to [A] non-treatment, [B] alkali treatment (h), or [C] alkali treatment (j), followed by burial for four weeks and subsequent development.

FIG. 2-2 is photographs of 5% citric acid-crosslinked base papers formed from base paper 2 that were treated by contact heating, and then subjected to [A] non-treatment, [B] alkali treatment (h), or [C] alkali treatment (j), followed by burial for four weeks and subsequent development.

FIG. 2-3 is photographs of 10% citric acid-crosslinked base papers formed from base paper 2 that were treated by contact heating, and then subjected to [A] non-treatment, [B] alkali treatment (h), or [C] alkali treatment (j), followed by burial for four weeks and subsequent development.

FIG. 2-4 is photographs of 15% citric acid-crosslinked base papers formed from base paper 2 that were treated by contact heating, and then subjected to [A] non-treatment, [B] alkali treatment (h), or [C] alkali treatment (j), followed by burial for four weeks and subsequent development.

FIG. 3-1 is photographs of DMDHEU-crosslinked base papers formed from base paper 2 that were treated by non-contact heating, and then subjected to [A] non-treatment, [B] alkali treatment (h), or [C] alkali treatment (j), followed by burial for two weeks and subsequent development.

FIG. 3-2 is photographs of 5% citric acid-crosslinked base papers formed from base paper 2 that were treated by non-contact heating, and then subjected to [A] non-treatment, [B] alkali treatment (h), or [C] alkali treatment (j), followed by burial for two weeks and subsequent development.

FIG. 3-3 is photographs of 10% citric acid-crosslinked base papers formed from base paper 2 that were treated by non-contact heating, and then subjected to [A] non-treatment, [B] alkali treatment (h), or [C] alkali treatment (j), followed by burial for two weeks and subsequent development.

FIG. 3-4 is photographs of 15% citric acid-crosslinked base papers formed from base paper 2 that were treated by non-contact heating, and then subjected to [A] non-treatment, [B] alkali treatment (h), or [C] alkali treatment (j), followed by burial for two weeks and subsequent development.

FIG. 4-1 is photographs of DMDHEU-crosslinked base papers formed from base paper 2 that were treated by non-contact heating, and then subjected to [A] non-treatment, [B] alkali treatment (h), or [C] alkali treatment (j), followed by burial for four weeks and subsequent development.

FIG. 4-2 is photographs of 5% citric acid-crosslinked base papers formed from base paper 2 that were treated by non-contact heating, and then subjected to [A] non-treatment, [B] alkali treatment (h), or [C] alkali treatment (j), followed by burial for four weeks and subsequent development.

FIG. 4-3 is photographs of 10% citric acid-crosslinked base papers formed from base paper 2 that were treated by non-contact heating, and then subjected to [A] non-treatment, [B] alkali treatment (h), or [C] alkali treatment (j), followed by burial for four weeks and subsequent development.

FIG. 4-4 is photographs of 15% citric acid-crosslinked base papers formed from base paper 2 that were treated by non-contact heating, and then subjected to [A] non-treatment, [B] alkali treatment (h), or [C] alkali treatment (j), followed by burial for four weeks and subsequent development.

MODES FOR CARRYING OUT THE INVENTION

Figure 5:
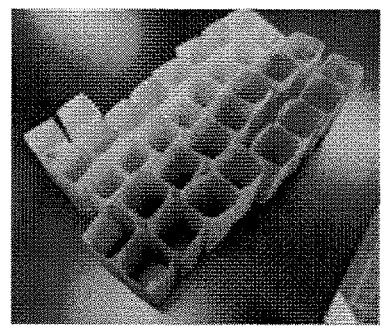
FIG. 5 is a photograph of raising seedling pots produced from base paper 1 and base paper 2.

In general, a raising seedling pot is produced from a wood fiber-containing paper, and thus the paper strength decreases upon wetting. In addition, since the pot is charged with culture soil during raising seedlings, the pot is degraded by microorganisms contained in the culture soil. Also, a paper mulch sheet (agricultural coating material) is degraded at a contact surface with the soil by microorganisms contained in the soil. This degradation generally proceeds through hydrolysis of cellulose forming the wood fiber of paper by cellulase (cellulose catabolic enzyme) produced from soil microorganisms.

The present inventors have conceived that the degradation of cellulose by cellulase is prevented through blocking of the hydroxy group of cellulose with a crosslinking agent that does not generate free formaldehyde; specifically, the paper is provided with corrosion resistance by treatment through reaction between the cellulose forming the paper and a carboxylic acid crosslinking agent.

In addition, the present inventors have found that when the paper is subjected to alkali treatment after being provided with corrosion resistance by the action of a carboxylic acid crosslinking agent, the temporarily provided corrosion resistance is lost, and thus the degradation of the paper by cellulase can be promoted, and that the degradability of the paper can be controlled by varying the conditions for the alkali treatment, to thereby adjust the period until degradation. The present invention has been accomplished on the basis of these findings.

The present invention will next be described in detail.

[Method for Controlling Degradation of Corrosion-Resistant Paper]

[Corrosion-Resistant Paper]

In the method for controlling the degradation of a corrosion-resistant paper of the present invention, the targeted corrosion-resistant paper comprises a cellulose fiber-containing paper and a carboxylic acid crosslinking agent, and is characterized in that the cellulose fiber is at least partially bonded to the carboxylic acid crosslinking agent. Thus, the corrosion-resistant paper targeted by the present invention may contain a carboxylic acid crosslinking agent that is not crosslinked with the cellulose fiber.

<Paper>

No particular limitation is imposed on the type of raw material pulp or the amount of cellulose fiber contained in the paper used in the present invention; i.e., the paper (may be referred to as "base paper") serving as a raw material of the corrosion-resistant paper, so long as the base paper contains cellulose fiber as a main component. For example, the base paper may be pulp-containing paper used as a common papermaking material. More specific examples of the material include chemical pulps, such as kraft pulp (KP), sulfite pulp (SP), and soda pulp (AP); semichemical pulps, such as semichemical pulp (SCP) and chemiground wood pulp (CGP); mechanical pulps, such as ground pulp (GP), thermomechanical pulp (TMP, BCTMP), and refiner groundwood pulp (RGP); non-wood fiber pulps produced from, for example, paper mulberry, paper bush, hemp, and kenaf; and deinking pulps produced from used paper. These may be used alone or in combination of two or more species. In particular, the base paper used is preferably one formed from unbleached pulp. The wood serving as a raw material of pulp fiber may be coniferous wood or hardwood, or a mixture thereof. The base paper may contain, besides any of these, chemical fiber such as polyethylene, polyester, vinylon, rayon, synthetic pulp, or polylactate.

If necessary, the paper used in the present invention may contain any auxiliary agent generally used for papermaking, such as a binder, a filler, a paper strength enhancer, a sizing agent, a yield improver, or a preservative. The paper may be subjected to sizing treatment with, for example, starch or polyvinyl alcohol, so long as the below-described reaction with a carboxylic acid crosslinking agent is not inhibited. Alternatively, the paper may be provided with a coating layer or resin coating layer containing an inorganic pigment as a main component.

No particular limitation is imposed on the basis weight of the paper used in the present invention. The basis weight may be, for example, 20 to 200 g/m$^2$, or, for example, 30 to 100 g/m$^2$, or 40 to 60 g/m$^2$.

<Carboxylic Acid Crosslinking Agent>

The carboxylic acid crosslinking agent used in the present invention may be a carboxylic acid crosslinking agent such as a dicarboxylic acid or a polycarboxylic acid. Examples of the carboxylic acid crosslinking agent include citric acid, tartaric acid, malic acid, oxalic acid, malonic acid, succinic acid, glutaric acid, adipic acid, fumaric acid, maleic acid, citraconic acid, itaconic acid, tartrate monosuccinic acid, iminodisuccinic acid, butanetetracarboxylic acid, polyacrylic acid, polymethacrylic acid, polymaleic acid, polymethyl vinyl ether-co-maleate copolymer, polymethyl vinyl ether-co-itaconate copolymer, acrylic acid polymer, maleic acid polymer, and salts thereof.

Examples of particularly preferred carboxylic acid crosslinking agents include citric acid, butanetetracarboxylic acid, iminodisuccinic acid, maleic acid, fumaric acid, oxalic acid, malonic acid, succinic acid, adipic acid, and salts thereof.

The amount of the aforementioned carboxylic acid crosslinking agent to be incorporated; i.e., the amount of the carboxylic acid crosslinking agent used (applied) for the paper to be treated varies depending on, for example, the type of the paper (e.g., pulp type, cellulose content, or basis weight). For example, the amount of the carboxylic acid crosslinking agent can be appropriately adjusted so that a raising seedling pot produced from the corrosion-resistant paper of the present invention can maintain a sufficient strength during raising seedlings and planting using the pot, or a paper mulch sheet produced from the corrosion-resistant paper of the present invention exhibits a sufficient strength upon stretching of the paper mulch sheet on the soil and during growth of agricultural crops, etc. in the soil covered with the paper mulch sheet. For example, the amount of the carboxylic acid crosslinking agent used (applied) may be 0.3 to 25.0% by mass relative to 100% by mass of the dry mass of the paper to be treated. In a preferred embodiment, the carboxylic acid crosslinking agent can be used (applied) in an amount of 0.3 to 20.0% by mass, for example, 2.4 to 20.0% by mass, 2.4 to 17.0% by mass, 7.5 to 20.0% by mass, 7.5 to 17.0% by mass, or 10.0 to 17.0% by mass. In a more preferred embodiment, the carboxylic acid crosslinking agent can be used (applied) in an amount of 13.0 to 17.0% by mass. When the amount of the carboxylic acid crosslinking agent used (applied) is adjusted to 0.3% by mass or more, the resultant paper can be provided with corrosion resistance; i.e., the paper can be prevented from being broken during raising seedlings, transplanting, stretching, or growth of agricultural crops, etc.

<Crosslinking Catalyst>

In the aforementioned corrosion-resistant paper, the carboxylic acid crosslinking agent may be used in combination with a crosslinking catalyst for the purpose of promoting reaction (i.e., allowing reaction to proceed within a short period of time).

Examples of the crosslinking catalyst include alkali metal hypophosphites such as sodium hypophosphite and potassium hypophosphite, phosphates, alkali metal phosphites, alkali metal polyphosphates, alkali metal dihydrogenphosphates such as disodium hydrogenphosphate, alkali metal phosphates, alkali metal hydrogenphosphates, polyphosphoric acid, hypophosphorous acid, phosphoric acid, phosphates such as allylphosphinic acid, metal salts such as magnesium chloride, zinc chloride, aluminum chloride, magnesium sulfate, zinc sulfate, aluminum sulfate, magnesium nitrate, zinc nitrate, magnesium borofluoride, and zinc borofluoride, ammonium salts such as ammonium chloride, ammonium sulfate, and ammonium phosphate, and organic amine salts such as monoethanolamine hydrochloride. These crosslinking catalysts may be used alone or in combination of two or more species.

The amount of the aforementioned crosslinking catalyst used cannot be univocally determined, since various effects are obtained depending on, for example, the type of the carboxylic acid crosslinking agent used, the reactivity of the catalyst to the carboxylic acid crosslinking agent, or the type of the catalyst. Generally, the amount of the crosslinking catalyst used may be 0.1 to 40% by mass relative to the mass (100% by mass) of the carboxylic acid crosslinking agent. In a preferred embodiment, the amount of the crosslinking catalyst may be 0.1 to 30% by mass, for example, 10 to 30% by mass or 15 to 25% by mass.

<Step of Alkali Treatment>

The method for controlling the degradation of a corrosion-resistant paper of the present invention is characterized by including a step of alkali treatment of the aforementioned corrosion-resistant paper.

The alkali treatment involves treatment with an aqueous solution of any of an alkali metal or alkaline earth metal hydroxide, a tetraalkylammonium hydroxide, an alkali metal carbonate, and an alkali metal hydrogen carbonate, and treatment with an aqueous solution containing a basic substance, such as an ammine complex hydroxide prepared by dissolution of a hydroxide and an oxide in aqueous ammonia, an alkylsulfonium hydroxide, or an alkyliodonium hydroxide. Specifically, the alkali treatment may be performed by immersing the aforementioned corrosion-resistant paper in an alkaline aqueous solution containing a basic substance such as sodium hydroxide, potassium hydroxide, calcium hydroxide, lithium hydroxide, rubidium hydroxide, cesium hydroxide, tetramethylammonium hydroxide, tetraethylammonium hydroxide, strontium hydroxide, barium hydroxide, europium hydroxide, thallium hydroxide, diamminesilver(I) hydroxide, tetraamminecopper(II) hydroxide, trimethylsulfonium hydroxide, diphenyliodonium hydroxide, sodium hydrogen carbonate, sodium carbonate, potassium carbonate, calcium carbonate, ammonium carbonate, barium carbonate, magnesium carbonate, lithium carbonate, silver(I) carbonate, iron(II) carbonate, and copper(II) carbonate, or alkaline electrolyzed water. Alternatively, the alkali treatment may be performed by applying or spraying the alkaline aqueous solution or alkaline electrolyzed water to the aforementioned corrosion-resistant paper. The aforementioned basic substance may be sprayed in the form of powder or granules; for example, quicklime, calcium silicate, magnesia lime, calcium sulfate, or lime nitrogen may be sprayed. From the viewpoint of achieving uniform alkali treatment on the entire corrosion-resistant paper, the alkali treatment is preferably performed by immersing the corrosion-resistant paper in the alkaline aqueous solution or alkaline electrolyzed water.

The immersion in or application of the alkaline aqueous solution or alkaline electrolyzed water may involve the use of any known coating or impregnating apparatus, such as a roller coater, a bar coater, a doctor coater, a blade coater, or a curtain coater.

The aqueous solution or alkaline electrolyzed water used for the aforementioned alkali treatment has a pH of 8 or more, preferably 9 or more. The pH of the aqueous solution may be, for example, pH 9 to pH 13, or pH 10 to pH 12, or pH 11 to pH 13.

The temperature and time of the aforementioned alkali treatment may vary depending on, for example, the type of the base selected, the pH or concentration of the alkaline aqueous solution, or the pH of alkaline electrolyzed water. Generally, the temperature may be ambient temperature (20±5° C.), and the time may be determined to fall within a range of about 3 hours to 24 hours.

[Production Method for Corrosion-Resistant Paper Having Controlled Degradability]

The present invention is also directed to a production method for a corrosion-resistant paper having controlled degradability.

In the corrosion-resistant paper targeted by the present invention, the treatment for bonding the aforementioned carboxylic acid crosslinking agent to the cellulose fiber contained in the aforementioned paper may be performed by, for example, applying the carboxylic acid crosslinking agent to the paper, and then heating the paper for allowing reaction of the carboxylic acid crosslinking agent to proceed.

Thus, the production method for a corrosion-resistant paper having controlled degradability according to the present invention is characterized by including a step of preparing a processing liquid containing the aforementioned carboxylic acid crosslinking agent and, if desired, the aforementioned crosslinking catalyst, and applying the processing liquid to at least a portion of a target paper (cellulose fiber-containing paper); a step of thermally treating the processing liquid-applied paper; and a step of alkali treatment of the thermally treated paper.

<Step of Papermaking of Base Paper>

In the present embodiment, the base paper is preferably produced by the papermaking method. The use of the papermaking method can facilitate mixing of plural types of fibers.

The papermaking method generally involves mixing short fibers serving as a raw material and forming the mixture into a sheet. The papermaking method is roughly divided into a dry method and a wet method. Specifically, the dry method involves dry blending of short fibers, and then accumulation of the fibers on a net by using a stream of air, to thereby form a sheet. The sheet may be formed by using, for example, a stream of water. Meanwhile, the wet method involves dispersion and mixing of short fibers in a liquid medium, and then accumulation of the fibers on a net, to thereby form a sheet. Of these methods, preferably selected is a wet papermaking method using water as a medium.

The wet papermaking method generally involves feeding of an aqueous slurry containing short fibers to a paper machine, dispersion of the short fibers, and then dehydration, squeezing, and drying, to thereby roll up a sheet. Examples of the usable paper machine include a fourdrinier paper machine, a cylinder paper machine, an inclined paper machine, and a combination of these (i.e., a combination paper machine).

The production of the base paper by the papermaking method requires a drying step, since pulp fiber contains water. Generally, the drying step is performed at a temperature of preferably 100° C. or higher, more preferably about 120 to 140° C. The drying step involves the use of a dryer, for example, a multi-cylinder dryer, a Yankee dryer, an after-dryer, a band dryer, or an infrared dryer.

<Step of Applying Processing Liquid>

This step may involve the use of a processing liquid prepared by dilution and formulation of the aforementioned carboxylic acid crosslinking agent and, if desired, the aforementioned crosslinking catalyst with water so as to achieve an appropriate concentration. The processing liquid may contain an additional additive that can be commonly used for paper processing, so long as the effects of the present invention are not impaired.

The amount of the carboxylic acid crosslinking agent contained in the aforementioned processing liquid may be appropriately determined in consideration of, for example, the amount of the liquid applied to a paper. The amount of the carboxylic acid crosslinking agent may be, for example, 0.3 to 25.0% by mass. In a preferred embodiment, the amount of the carboxylic acid crosslinking agent contained in the processing liquid may be 1.0 to 20.0% by mass, 5.0 to 20.0% by mass, 7.5 to 15.0% by mass, 10.0 to 15.0% by mass, or 12.5 to 15.0% by mass.

When the crosslinking catalyst is used, the amount thereof may be 0.1 to 40% by mass relative to the mass (100% by mass) of the carboxylic acid crosslinking agent. In a preferred embodiment, the amount of the crosslinking catalyst may be 0.1 to 30% by mass, for example, 10 to 30% by mass or 15 to 25% by mass.

The solvent of the processing liquid, which can dissolve the carboxylic acid crosslinking agent or the crosslinking catalyst, may be appropriately determined in consideration of the applicability to a paper or handleability in the respective steps. For example, water can be used as the solvent.

Preferably, a processing liquid having an acidic pH (less than 7) is applied to a paper. For example, a processing liquid having a pH of 6 or less, 5 or less, or 4 or less can be used. Alternatively, a processing liquid having a pH of less than 4 can be used.

No particular limitation is imposed on the method for applying the aforementioned processing liquid to a paper, so long as a predetermined amount of the carboxylic acid crosslinking agent can be adhered to the paper. Preferably, there can be used a method for uniformly adhering a predetermined amount of the carboxylic acid crosslinking agent to the entire paper; for example, a method of exposing the paper to the vapor of the processing liquid, a method of immersing the paper in the processing liquid, or a method of applying or spraying the processing liquid to the paper. The immersing or applying method may involve the use of any known coating or impregnating apparatus, such as a roller coater, a bar coater, a doctor coater, a blade coater, or a curtain coater. When industrial treatment is performed in the papermaking step, the processing liquid may be applied to the paper in a size press step or a gate-rolling step. When the processing liquid is applied in the papermaking step, the processing liquid can be dried through the drying step.

<Step of Thermal Treatment>

After application of the processing liquid to the paper, the paper is subjected to thermal treatment. The thermal treatment is performed for allowing reaction of the above-applied carboxylic acid crosslinking agent to proceed, and for completing the reaction.

No particular limitation is imposed on the usable thermal treatment method, so long as it is a heating method that is commonly performed for paper. The thermal treatment method may be a contact heating method or a non-contact heating method. For example, the thermal treatment is performed by a contact heating method wherein one surface of the aforementioned paper is brought into contact with, for example, the cylinder surface (heating roll or heating plate) of a cylinder dryer heated at a predetermined temperature; a non-contact heating method wherein the paper is exposed to a high-temperature atmosphere in, for example, a circulating hot air dryer for a predetermined period of time; or a method of treatment with a far infrared dryer.

The thermal treatment temperature, which varies depending on the thermal treatment method, may be, for example, 30 to 300° C., and is preferably 100 to 250° C., more preferably 150 to 220° C. Alternatively, the thermal treatment temperature may be 190 to 220° C. The thermal treatment time may vary depending on the thermal treatment method. In the case of non-contact heating with a circulating hot air dryer, etc., the thermal treatment time is, for example, 30 seconds to 60 minutes, more preferably 1 to 15 minutes. In the case of contact heating with, for example, the heating roll and/or heating plate of a cylinder dryer, etc., the thermal treatment time is, for example, 0.5 seconds to 30 minutes, more preferably 1 second to 3 minutes. In this case, the temperature of a portion at which the processing liquid-applied paper comes into contact with the heating roll and/or the heating plate, etc. may be, for example, 150 to 250° C., and is preferably 190 to 220° C.

After application of the processing liquid to the paper, the paper may be preliminarily dried as appropriate before the thermal treatment, to thereby adjust the water content of the paper. The water content adjustment (preliminary drying) is desirably performed under such conditions that the reaction of the carboxylic acid crosslinking agent does not proceed virtually. The water content adjustment may be performed with any known drying means, such as a short loop dryer, a continuous tumble dryer, a tenter dryer, or a drum dryer. The adjustment of the water content of the paper is not essential in this stage, and may be performed in the base paper production stage (papermaking step).

As described above, the corrosion-resistant paper according to the present invention is formed through at least partial bonding between the cellulose fiber and the carboxylic acid crosslinking agent.

This bonding is attributed to formation of an ester bond between the hydroxy group of the cellulose fiber and the carboxylic acid crosslinking agent. The formation of the ester bond can be determined by measurement of infrared absorption spectra wherein the characteristic absorption peak of the ester bond appears strongly.

Specifically, when the peak attributed to the C=O stretching vibration of an ester is observed at around 1,730 cm$^{-1}$ in infrared absorption spectra, the introduction of this bond structure is determined.

Alternatively, the formation of the ester bond can be determined through observation of the low-field shift of the signal of hydrogen adjacent to the ester by nuclear magnetic resonance (NMR) spectroscopy, as compared with an untreated (non-crosslinked) case.

<Step of Alkali Treatment>

After the aforementioned thermal treatment, the resultant paper is subjected to alkali treatment. This step is performed for cleaving the ester bond between the hydroxy group of the cellulose fiber and the carboxylic acid crosslinking agent formed by application of the carboxylic acid crosslinking agent and subsequent thermal treatment.

As described above, the alkali treatment may be performed by immersing the aforementioned thermally treated paper in an alkaline aqueous solution containing a basic substance such as sodium hydroxide, potassium hydroxide, calcium hydroxide, lithium hydroxide, rubidium hydroxide, cesium hydroxide, tetramethylammonium hydroxide, tetraethylammonium hydroxide, strontium hydroxide, barium hydroxide, europium hydroxide, thallium hydroxide, diamminesilver(I) hydroxide, tetraamminecopper(II) hydroxide, trimethylsulfonium hydroxide, diphenyliodonium hydroxide, sodium hydrogen carbonate, sodium carbonate, potassium carbonate, calcium carbonate, ammonium carbonate, barium carbonate, magnesium carbonate, lithium carbonate, silver(I) carbonate, iron(II) carbonate, and copper(II) carbonate, or alkaline electrolyzed water. Alternatively, the alkali treatment may be performed by applying or spraying the aqueous solution or electrolyzed water to the aforementioned thermally treated paper. The aforementioned base may be sprayed in the form of powder or granules; for example, quicklime, calcium silicate, magnesia lime, calcium sulfate, or lime nitrogen may be sprayed. From the viewpoint of achieving uniform alkali treatment on the entire paper, the paper is preferably immersed in the alkaline aqueous solution or alkaline electrolyzed water.

The immersion in or application of the alkaline aqueous solution or alkaline electrolyzed water may involve the use of any known coating or impregnating apparatus, such as a roller coater, a bar coater, a doctor coater, a blade coater, or a curtain coater.

The aqueous solution or alkaline electrolyzed water used for the aforementioned alkali treatment has a pH of 8 or more, preferably 9 or more. The pH of the aqueous solution may be, for example, pH 9 to pH 13, or pH 10 to pH 12, or pH 11 to pH 13.

The temperature and time of the aforementioned alkali treatment may vary depending on, for example, the type of the base selected, the pH or concentration of the alkaline aqueous solution, or the pH of alkaline electrolyzed water. Generally, the temperature may be ambient temperature (20±5° C.), and the time may be determined to fall within a range of about 3 hours to 24 hours.

[Base Paper for Raising Seedling Pot and Raising Seedling Pot]

The corrosion-resistant paper targeted by the present invention can be suitably used as a base paper for a raising seedling pot. Thus, the present invention is also directed to a method for controlling the degradation of a base paper for a raising seedling pot composed of the aforementioned corrosion-resistant paper, a method for producing a base paper for a raising seedling pot having controlled degradability, and a method for producing a raising seedling pot from the base paper.

Also, the corrosion-resistant paper targeted by the present invention can be suitably used as a base paper for an agricultural paper mulch sheet (base paper for coating material). Thus, the present invention is also directed to a method for controlling the degradation of a base paper for an agricultural paper mulch sheet composed of the aforementioned corrosion-resistant paper, and a method for producing an agricultural paper mulch sheet having controlled degradability.

EXAMPLES

The present invention will next be described in more detail by way of Examples. In Examples, the performances of test samples were measured and evaluated by methods described below.

In the evaluations described below, a higher tensile strength value indicates more reduced degradation of cellulose contained in a sample.

(1) Tensile Strength (After Water Treatment and After Enzyme Treatment)

The tensile strength was measured with a constant rate elongation tensile tester (Autograph Tensile Tester, available from SHIMADZU CORPORATION) by the method according to JIS P8113:1998 "Paper and board—Determination of tensile properties—Part 2: Constant rate of elongation method."

The dimensions of a sample for measurement were adjusted to 60 mm×100 mm. The sample after water treatment or after enzyme treatment was elongated with a chuck span of 50 mm at a tensile rate of 10 mm/min, to thereby measure a strength at break. The measurement was repeated eight times, and the average (and the standard deviation) were calculated.

<Water Treatment>

The sample for measurement cut into the aforementioned dimensions was immersed in water (room temperature: 20° C.±5° C.) for 24 hours, and then the tensile strength of the sample was measured through the aforementioned procedure.

<Enzyme Treatment>

The sample for measurement cut into the aforementioned dimensions (alkali-treated sample in the case where the below-described alkali treatment was performed) was continuously treated for 72 hours in an incubator (45° C.) containing an enzyme liquid prepared so as to contain cellulase (Onozuka S, available from Yakult Pharmaceutical Industry Co., Ltd.) at a concentration of 1% and to have a pH of 5.0.

(2) Post-Burial Treatment Tensile Strength

A base paper sample was cut into dimensions of 30 mm×70 mm, and the cut sample (alkali-treated sample in the case where the below-described alkali treatment was performed) was buried in culture soil for green onion (Nitten Negi Baido (Hokkaido), available from Nippon Beet Sugar Manufacturing Co., Ltd., pH: 6.4, EC: 1.29 dS/m) prepared so as to have a water content of 50%, and then allowed to stand still in an artificial meteorological device (available from Nippon Medical & Chemical Instruments Co., Ltd.) at a temperature of 30° C. and a humidity of 90%. The sample was removed from the soil after being allowed to stand still for two weeks (i.e., burial treatment sample (two weeks)) or four weeks (i.e., burial treatment sample (four weeks)).

The tensile strength of the post-burial treatment sample was measured with a constant rate elongation tensile tester (Autograph Tensile Tester, available from SHIMADZU CORPORATION) by the method according to JIS P8113:1998 "Paper and board—Determination of tensile properties—Part 2: Constant rate of elongation method." The post-burial treatment sample was elongated with a chuck span of 30 mm at a tensile rate of 100 mm/min, to thereby measure a strength at break. The measurement was repeated four times, and the average (and the standard deviation) were calculated.

(3) Corrosion Resistance Index

Enzyme corrosion resistance index=[tensile strength (enzyme treatment)/tensile strength(water treatment)]×100

Burial treatment corrosion resistance index=[tensile strength(burial treatment)/tensile strength(water treatment)]×100

Enzyme corrosion resistance index is an index showing corrosion resistance after enzyme treatment. In consideration of the effects of the present invention, a required index value (required strength) is generally 75 or more.

Burial treatment corrosion resistance index is an index showing corrosion resistance after burial treatment. In consideration of the effects of the present invention, a required index value (required strength) is generally 75 or more.

<Example 1> Measurement of Tensile Strength after Citric Acid Treatment and Alkali Treatment
(1) (Enzyme Treatment)

<Citric Acid Treatment>

Paper serving as a raw material (unbleached kraft paper (untreated with chemical): unbleached kraft pulp paper having a basis weight of 53 g/m², hereinafter referred to as "base paper 1") was immersed in a processing liquid containing citric acid (carboxylic acid crosslinking agent) and sodium hypophosphite (crosslinking catalyst) at concentrations shown in Table 1 below for three minutes (temperature: ambient temperature (20° C. to 30° C.)). After completion of the immersion, the base paper 1 was passed through a squeezing roller to thereby remove excess chemicals. The mass of the base paper 1 was measured before and after immersion in the processing liquid, to thereby calculate the amount of the applied processing liquid (the amount of the processing liquid applied by immersion) and the amount of the active ingredient (the amount of citric acid) (see Table 1).

Thereafter, the immersed base paper 1 was dried with a drying roller, and then subjected to contact thermal treatment with a heating roller set at 220° C. for 4.5 seconds, to thereby prepare a citric acid-processed paper.

<DMDHEU Treatment>

In the same manner as in the aforementioned citric acid treatment, base paper 1 was treated with a dimethylol dihydroxyethylene urea (DMDHEU)-containing agent (active ingredient: DMDHEU, concentration: 3.6% by mass), to thereby prepare a DMDHEU-crosslinked base paper. Table 1 shows the amount of the applied processing liquid (the amount of the processing liquid applied by immersion) and the amount of the active ingredient (the amount of DMDHEU).

TABLE 1

Amounts of applied chemicals

| | | | Amount of applied processing liquid (g/m²) | Amount of active ingredient* (g/m²) |
|---|---|---|---|---|
| | DMDHEU-containing agent | | 68.6 | 2.47 |
| Citric acid treatment | Citric acid concentration 10.0% (w/v) | Na hypophosphite concentration 2.0% (w/v) | 69.6 | 6.64 |

*Amount of active ingredient corresponds to the amount of citric acid (note: the amount of DMDHEU only in the case of DMDHEU-containing agent).

<Alkali Treatment>

The citric acid-processed paper (10% citric acid treatment) and DMDHEU-crosslinked base paper prepared through the aforementioned procedure were subjected to alkali treatment under the conditions described below, and the alkali was rinsed off with water after the treatment.
  (a) Immersed in 4% by mass aqueous calcium carbonate solution at ambient temperature (20° C.±5° C.) for 24 hours.
  (b) Immersed in 4% by mass aqueous potassium carbonate solution at ambient temperature (20° C.±5° C.) for 24 hours.

<Measurement of Tensile Strength>

The tensile strengths (after water treatment) of the citric acid-processed paper (10% citric acid treatment) and the DMDHEU-crosslinked base paper before the alkali treatment were measured through the aforementioned procedure.

The citric acid-processed paper (10% citric acid treatment) and the DMDHEU-crosslinked base paper before the alkali treatment and after the alkali treatment (a) or (b) were subjected to enzyme treatment through the aforementioned procedure. The tensile strengths of the papers were measured after the enzyme treatment, to thereby calculate enzyme corrosion resistance indexes.

The results are shown in Table 2.

TABLE 2

Test results

| (Base paper 1: kraft pulp paper) Contact thermal treatment | | DMDHEU | Citric acid 10% |
|---|---|---|---|
| Water treatment | Tensile strength [N/60 mm] | 161.8 ± 21.8 | 146.1 ± 6.8 |
| | Enzyme corrosion resistance index | 100 | 100 |
| Enzyme treatment | Tensile strength [N/60 mm] | 140.9 ± 6.9 | 118.2 ± 3.5 |
| | Enzyme corrosion resistance index | 87 | 81 |
| Alkali treatment (a) + enzyme treatment | Tensile strength [N/60 mm] | 144.4 ± 4.6 | 111.7 ± 8.5 |
| | Enzyme corrosion resistance index | 89 | 77 |
| Alkali treatment (b) + enzyme treatment | Tensile strength [N/60 mm] | 127.1 ± 6.6 | 0.0 ± 0.0 |
| | Enzyme corrosion resistance index | 79 | 0 |

* Alkali treatment (a): immersed in 4% by mass aqueous calcium carbonate solution at ambient temperature (20° C. ± 5° C.) for 24 hours.
Alkali treatment (b): immersed in 4% by mass aqueous potassium carbonate solution at ambient temperature (20° C. ± 5° C.) for 24 hours.

As shown in Table 2, regarding the citric acid-processed paper (10%), the sample subjected to the enzyme treatment exhibited a lower tensile strength than the sample subjected to only the water treatment, and the sample subjected to the alkali treatment (a) and the enzyme treatment exhibited a lower tensile strength than the sample subjected to the enzyme treatment. However, these samples exhibited an enzyme corrosion resistance index of 80 or thereabouts; i.e., sufficient corrosion resistance. In contrast, in the sample subjected to the alkali treatment (b) and the enzyme treatment, degradation proceeded to such an extent as to fail to measure the tensile strength.

The results suggested that the alkali treatment (b) (i.e., alkali treatment with 4% by mass aqueous potassium carbonate solution) can cause de-esterification in the citric acid crosslinking, to thereby impart degradability again to the corrosion resistance-provided base paper; i.e., the degradation of the citric acid-processed paper can be controlled by a potassium carbonate solution.

Meanwhile, regarding the DMDHEU-crosslinked base paper, the sample subjected to the enzyme treatment and the sample subjected to the alkali treatment and the enzyme treatment (a) or (b) exhibited a somewhat lower tensile strength than the sample subjected to only the water treatment, but these enzyme-treated samples exhibited an enzyme corrosion resistance index of more than about 80; i.e., sufficient corrosion resistance. Thus, the effect of promoting degradation by the alkali treatment was not determined in the DMDHEU-crosslinked base paper.

<Example 2> Measurement of Tensile Strength after Citric Acid Treatment and Alkali Treatment (2) (Enzyme Treatment)

<Citric Acid Treatment>

Paper serving as a raw material (unbleached kraft paper (untreated with chemical): chemical fiber-mixed unbleached kraft pulp paper having a basis weight of 53 g/m², hereinafter referred to as "base paper 2") was immersed in a processing liquid containing citric acid (carboxylic acid crosslinking agent) and sodium hypophosphite (crosslinking catalyst) at concentrations shown in Table 3 below for three minutes (temperature: ambient temperature (20° C. to 30° C.)). After completion of the immersion, the base paper 2 was passed through a squeezing roller to thereby remove excess chemicals. The mass of the base paper 2 was measured before and after immersion in the processing liquid, to thereby calculate the amount of the applied processing liquid (the amount of the processing liquid applied by immersion) and the amount of the active ingredient (the amount of citric acid) (see Table 3).

Thereafter, the immersed base paper 2 was dried with a drying roller, and then subjected to contact thermal treatment with a heating roller set at 220° C. for 4.5 seconds, to thereby prepare a citric acid-processed paper.

<DMDHEU Treatment>

In the same manner as in the aforementioned citric acid treatment, base paper 2 was treated with a dimethylol dihydroxyethylene urea (DMDHEU)-containing agent (active ingredient: DMDHEU, concentration: 7.2% by mass), to thereby prepare a DMDHEU-crosslinked base paper. Table 3 shows the amount of the applied processing liquid (the amount of the processing liquid applied by immersion) and the amount of the active ingredient (the amount of DMDHEU).

TABLE 3

Amounts of applied chemicals

|  |  |  | Amount of applied processing liquid (g/m$^2$) | Amount of active ingredient* (g/m$^2$) |
|---|---|---|---|---|
|  | DMDHEU-containing agent |  | 54.6 | 3.93 |
| Citric acid treatment | Citric acid concentration | Na hypophosphite concentration |  |  |
|  | 10.0% (w/v) | 2.0% (w/v) | 57.1 | 5.71 |
|  | 15.0% (w/v) | 3.0% (w/v) | 58.6 | 8.78 |

*Amount of active ingredient corresponds to the amount of citric acid (note: the amount of DMDHEU only in the case of DMDHEU-containing agent).

<Alkali Treatment>

The citric acid-processed paper (10% or 15% citric acid treatment) and DMDHEU-crosslinked base paper prepared through the aforementioned procedure were subjected to alkali treatment under the conditions described below, and the alkali was rinsed off with water after the treatment.

(c) Immersed in 2% by mass aqueous potassium carbonate solution at ambient temperature (20° C.±5° C.) for 24 hours.

(d) Immersed in 1% by mass aqueous potassium carbonate solution at ambient temperature (20° C.±5° C.) for 12 hours.

(e) Immersed in 1% by mass aqueous potassium carbonate solution at ambient temperature (20° C.±5° C.) for three hours.

<Measurement of Tensile Strength>

The tensile strengths (after water treatment) of the citric acid-processed paper (10% or 15% citric acid treatment) and the DMDHEU-crosslinked base paper before the alkali treatment were measured through the aforementioned procedure.

The citric acid-processed paper (10% or 15% citric acid treatment) and the DMDHEU-crosslinked base paper before the alkali treatment and after the alkali treatments (c) to (e) were subjected to enzyme treatment through the aforementioned procedure. The tensile strengths of the papers were measured after the enzyme treatment, to thereby calculate enzyme corrosion resistance indexes.

The results are shown in Table 4.

TABLE 4

Test results

| (Base paper 2: chemical fiber-mixed kraft pulp paper) | | | Citric acid | |
|---|---|---|---|---|
| Contact thermal treatment | | DMDHEU | 10% | 15% |
| Water treatment | Tensile strength [N/60 mm] | 134.9 ± 10.4 | 120.3 ± 7.2 | 120.2 ± 8.8 |
|  | Enzyme corrosion resistance index | 100 | 100 | 100 |
| Enzyme treatment | Tensile strength [N/60 mm] | 132.8 ± 5.9 | 111.9 ± 5.4 | 116.3 ± 5.9 |
|  | Enzyme corrosion resistance index | 99 | 93 | 97 |
| Alkali treatment (c) + enzyme treatment | Tensile strength [N/60 mm] | 119.5 ± 4.5 | Not measured | Not measured |
|  | Enzyme corrosion resistance index | 89 | Degradation | Degradation |
| Alkali treatment (d) + enzyme treatment | Tensile strength [N/60 mm] | 129.0 ± 7.4 | 56.4 ± 9.9 | 73.6 ± 2.8 |
|  | Enzyme corrosion resistance index | 96 | 47 | 61 |
| Alkali treatment (e) + enzyme treatment | Tensile strength [N/60 mm] | 124.6 ± 7.8 | 82.5 ± 4.7 | 93.1 ± 4.5 |
|  | Enzyme corrosion resistance index | 92 | 69 | 77 |

* Alkali treatment (c): immersed in 2% by mass aqueous potassium carbonate solution at ambient temperature (20° C. ± 5° C.) for 24 hours.
Alkali treatment (d): immersed in 1% by mass aqueous potassium carbonate solution at ambient temperature (20° C. ± 5° C.) for 12 hours.
Alkali treatment (e): immersed in 1% by mass aqueous potassium carbonate solution at ambient temperature (20° C. ± 5° C.) for three hours.

As shown in Table 4, regarding the citric acid-processed paper (10%) and the citric acid-processed paper (15%), the sample subjected to the enzyme treatment exhibited an enzyme corrosion resistance index of more than 90; i.e., sufficient corrosion resistance, as compared with the sample subjected to only the water treatment.

Regarding both the citric acid-processed papers, degradation proceeded to such an extent as to fail to measure the tensile strength in the sample subjected to the alkali treatment (c) and the enzyme treatment. The results suggested that the alkali treatment (c) (i.e., alkali treatment by 24-hour immersion in 2% by mass aqueous potassium carbonate solution) can cause de-esterification in the citric acid crosslinking, to thereby impart degradability again to the corrosion resistance-provided base paper; i.e., the degradation of the citric acid-processed paper can be controlled by a potassium carbonate solution.

Regarding both the citric acid-processed papers, the sample subjected to the alkali treatment (d) and the enzyme treatment and the sample subjected to the alkali treatment (e) and the enzyme treatment exhibited a lower tensile strength than the sample subjected to only the water treatment, but maintained the form of paper. In both the citric acid-processed papers, the sample subjected to longer-term alkali treatment (alkali treatment (d)) exhibited lower tensile strength. The citric acid-processed paper (15%) exhibited slightly higher tensile strength and enzyme corrosion resistance index than the citric acid-processed paper (10%).

These results suggested that the degradation level of the citric acid-processed paper can be controlled by the concentration of the aqueous potassium carbonate solution used for the alkali treatment and the time of immersion in the solution, and that the strength of the citric acid crosslinking correlates with the ease of de-esterification.

Meanwhile, regarding the DMDHEU-crosslinked base paper, the sample subjected to the enzyme treatment and the samples subjected to the alkali treatment and the enzyme treatments (c) to (e) exhibited a somewhat lower tensile strength than the sample subjected to only the water treatment, but these enzyme-treated samples exhibited an enzyme corrosion resistance index of more than about 80; i.e., sufficient corrosion resistance. Thus, the effect of promoting degradation by the alkali treatment was not determined in the DMDHEU-crosslinked base paper even when the treatment conditions (e.g., concentration and immersion time) were varied.

<Example 3> Measurement of Tensile Strength after Citric Acid Treatment and Alkali Treatment (3) (Enzyme Treatment)

<Citric Acid Treatment>

Base paper 2 was immersed in a processing liquid containing citric acid (carboxylic acid crosslinking agent) and sodium hypophosphite (crosslinking catalyst) at concentrations shown in Table 5 below for three minutes (temperature: ambient temperature (20° C. to 30° C.)). After completion of the immersion, the base paper 2 was passed through a squeezing roller to thereby remove excess chemicals. The mass of the base paper 2 was measured before and after immersion in the processing liquid, to thereby calculate the amount of the applied processing liquid (the amount of the processing liquid applied by immersion) and the amount of the active ingredient (the amount of citric acid) (see Table 5).

Thereafter, the immersed base paper 2 was dried with a drying roller, and then subjected to (i) contact thermal treatment with a heating roller set at 220° C. for 4.5 seconds or (ii) non-contact thermal treatment with a drier (oven) set at 190° C. for three minutes, to thereby prepare a citric acid-processed paper.

<DMDHEU Treatment>

In the same manner as in the aforementioned citric acid treatment, base paper 2 was treated with a dimethylol dihydroxyethylene urea (DMDHEU)-containing agent (active ingredient: DMDHEU, concentration: 3.6% by mass), to thereby prepare a DMDHEU-crosslinked base paper. Table 5 shows the amount of the applied processing liquid (the amount of the processing liquid applied by immersion) and the amount of the active ingredient (the amount of DMDHEU).

TABLE 5

Amounts of applied chemicals

|  |  |  |  | Amount of applied processing liquid (g/m$^2$) | Amount of active ingredient* (g/m$^2$) |
|---|---|---|---|---|---|
| Sample for 220° C. thermal treatment (contact heating) |  | DMDHEU-containing agent |  | 53.9 | 1.94 |
|  | Citric acid treatment | Citric acid concentration | Na hypophosphite concentration |  |  |
|  |  | 5.0% (w/v) | 1.0% (w/v) | 54.8 | 2.74 |
|  |  | 10.0% (w/v) | 2.0% (w/v) | 56.8 | 5.68 |
|  |  | 15.0% (w/v) | 3.0% (w/v) | 58.0 | 8.69 |
| Sample for 190° C. thermal treatment (non-contact heating) |  | DMDHEU-containing agent |  | 52.8 | 1.90 |
|  | Citric acid treatment | Citric acid concentration | Na hypophosphite concentration |  |  |
|  |  | 5.0% (w/v) | 1.0% (w/v) | 55.3 | 2.76 |
|  |  | 10.0% (w/v) | 2.0% (w/v) | 56.6 | 5.66 |
|  |  | 15.0% (w/v) | 3.0% (w/v) | 57.3 | 8.60 |

*Amount of active ingredient corresponds to the amount of citric acid (note: the amount of DMDHEU only in the case of DMDHEU-containing agent).

<Alkali Treatment>

The citric acid-processed paper ((i) contact thermal treatment or (ii) non-contact thermal treatment) (5%, 10%, or 15% citric acid treatment) and DMDHEU-crosslinked base paper prepared through the aforementioned procedure were subjected to alkali treatment under the conditions described below, and the alkali was rinsed off with water after the treatment.

(f) Immersed in 2% by mass aqueous potassium carbonate solution at ambient temperature (20° C.±5° C.) for 24 hours.

(g) Immersed in saturated aqueous calcium hydroxide solution (prepared by addition of 2 g of calcium hydroxide to 1 L of water, the same shall apply hereinafter) at ambient temperature (20° C.±5° C.) for 24 hours.

<Measurement of Tensile Strength>

The tensile strengths (after water treatment) of the citric acid-processed paper (5%, 10%, or 15% citric acid treatment) and the DMDHEU-crosslinked base paper before the alkali treatment were measured through the aforementioned procedure.

The citric acid-processed paper (5%, 10%, or 15% citric acid treatment) and the DMDHEU-crosslinked base paper before the alkali treatment and after the alkali treatment (f) or (g) were subjected to enzyme treatment through the aforementioned procedure. The tensile strengths of the papers were measured after the enzyme treatment, to thereby calculate enzyme corrosion resistance indexes.

The results are shown in Table 6 (contact thermal treatment) and Table 7 (non-contact thermal treatment).

TABLE 6

Test results (contact thermal treatment)

| (Base paper 2: chemical fiber-mixed kraft pulp paper) | | | Citric acid | | |
|---|---|---|---|---|---|
| Contact thermal treatment | | DMDHEU | 5% | 10% | 15% |
| Water treatment | Tensile strength [N/60 mm] | 139.6 ± 11.1 | 106.1 ± 10.0 | 119.5 ± 6.9 | 118.9 ± 7.2 |
| | Enzyme corrosion resistance index | 100 | 100 | 100 | 100 |
| Enzyme treatment | Tensile strength [N/60 mm] | 127.7 ± 6.3 | 50.2 ± 28.3 | 109.7 ± 6.5 | 112.0 ± 5.6 |
| | Enzyme corrosion resistance index | 92 | 40 | 87 | 91 |
| Alkali treatment (f) + enzyme treatment | Tensile strength [N/60 mm] | 115.0 ± 9.0 | Not measured Degradation | Not measured Degradation | 13.4 ± 1.6 |
| | Enzyme corrosion resistance index | 82 | | | 11 |
| Alkali treatment (g) + enzyme treatment | Tensile strength [N/60 mm] | 115.3 ± 5.9 | Not measured Degradation | Not measured Degradation | Not measured Degradation |
| | Enzyme corrosion resistance index | 83 | | | |

*Alkali treatment (f): immersed in 2% by mass aqueous potassium carbonate solution at ambient temperature (20° C. ± 5° C.) for 24 hours.
Alkali treatment (g): immersed in saturated aqueous calcium hydroxide solution at ambient temperature (20° C. ± 5° C.) for 24 hours.

TABLE 7

Test results (non-contact thermal treatment)

| (Base paper 2: chemical fiber-mixed kraft pulp paper) | | | Citric acid | | |
|---|---|---|---|---|---|
| Non-contact thermal treatment | | DMDHEU | 5% | 10% | 15% |
| Water treatment | Tensile strength [N/60 mm] | 125.4 ± 9.1 | 130.8 ± 9.1 | 135.4 ± 16.2 | 129.3 ± 9.1 |
| | Enzyme corrosion resistance index | 100 | 100 | 100 | 100 |
| Enzyme treatment | Tensile strength [N/60 mm] | 107.7 ± 14.5 | 123.0 ± 8.7 | 125.9 ± 14.3 | 133.1 ± 11.2 |
| | Enzyme corrosion resistance index | 86 | 94 | 93 | 103 |
| Alkali treatment (f) + enzyme treatment | Tensile strength [N/60 mm] | 108.9 ± 12.2 | 12.1 ± 5.1 | 43.2 ± 14.1 | 140.5 ± 7.2 |
| | Enzyme corrosion resistance index | 87 | 9 | 32 | 109 |
| Alkali treatment (g) + enzyme treatment | Tensile strength [N/60 mm] | 101.3 ± 6.4 | Not measured Degradation | Not measured Degradation | Not measured Degradation |
| | Enzyme corrosion resistance index | 81 | | | |

*Alkali treatment (f): immersed in 2% by mass aqueous potassium carbonate solution at ambient temperature (20° C. ± 5° C.) for 24 hours.
Alkali treatment (g): immersed in saturated aqueous calcium hydroxide solution at ambient temperature (20° C. ± 5° C.) for 24 hours.

In the case of the contact thermal treatment shown in Table 6, regarding the citric acid-processed paper (10%) and the citric acid-processed paper (15%), the samples subjected to the enzyme treatment exhibited an enzyme corrosion resistance index of 90 or thereabouts; i.e., sufficient corrosion resistance. Meanwhile, regarding the citric acid-processed paper (5%), the sample subjected to the enzyme treatment exhibited a certain level of tensile strength but an enzyme corrosion resistance index of 40, suggesting a low degree of citric acid crosslinking.

Regarding all the citric acid-processed papers, the samples subjected to the alkali treatment (f) or (g) and the enzyme treatment exhibited significantly lowered tensile strength, and degradation proceeded to such an extent as to fail to measure the tensile strength in most samples.

In the case of the non-contact thermal treatment shown in Table 7, regarding all the citric acid-processed paper (5%), the citric acid-processed paper (10%), and the citric acid-processed paper (15%), the samples subjected to the enzyme treatment exhibited an enzyme corrosion resistance index of more than 90; i.e., sufficient corrosion resistance.

The samples subjected to the alkali treatment (f) and the enzyme treatment exhibited significantly lowered tensile strength and enzyme corrosion resistance index in accordance with a decrease in citric acid concentration for the treatment, but even the sample of the citric acid-processed paper (5%) maintained the form of paper.

Meanwhile, degradation proceeded to such an extent as to fail to measure the tensile strength in the samples subjected to the alkali treatment (g) and the enzyme treatment in all the citric acid-processed papers.

These results suggested that, in the case of the contact thermal treatment, the citric acid-processed paper (treated with citric acid at a concentration of 10% or more) can be provided with a certain level of corrosion resistance, and the alkali treatment (g) (i.e., 24-hour immersion in saturated aqueous calcium hydroxide solution) can cause de-esterification in the citric acid crosslinking, to thereby impart degradability again to the corrosion resistance-provided base paper.

The results also suggested that, in the case of the non-contact thermal treatment, the citric acid-processed paper (treated with citric acid at a concentration of 5% or more) can be provided with a certain level of corrosion resistance, and the alkali treatment (g) (i.e., 24-hour immersion in saturated aqueous calcium hydroxide solution) can cause de-esterification in the citric acid crosslinking, to thereby impart degradability again to the corrosion resistance-provided base paper.

These results suggested that the degradation level of the citric acid-processed paper can be controlled by the type of the solution used for the alkali treatment, and that the strength of the citric acid crosslinking correlates with the ease of de-esterification.

The aforementioned results also indicated that the samples prepared through the non-contact thermal treatment exhibit higher post-enzyme treatment tensile strength and enzyme corrosion resistance index than the samples prepared through the contact thermal treatment, and exhibit corrosion resistance even after the alkali treatment (f) (i.e., 24-hour immersion in 2% by mass aqueous potassium carbonate solution), suggesting that the degradation of the citric acid-processed paper can also be controlled by the thermal treatment method.

As shown in Tables 6 and 7, regarding the DMDHEU-crosslinked base paper, the sample subjected to the enzyme treatment and the samples subjected to the alkali treatments (f) and (g) and the enzyme treatment exhibited a somewhat lower tensile strength than the sample subjected to only the water treatment, but exhibited an enzyme corrosion resistance index of more than about 80; i.e., sufficient corrosion resistance. Thus, the effect of promoting degradation by the alkali treatment was not determined in the DMDHEU-crosslinked base paper even when the alkali types were varied. Meanwhile, the difference in effect due to the difference in thermal treatment method was not determined.

<Example 4> Measurement of Tensile Strength after Citric Acid Treatment and Alkali Treatment (4) (Burial Treatment)

The post-burial treatment tensile strength was measured by using the citric acid-processed paper (5%, 10%, or 15% citric acid treatment) and DMDHEU-crosslinked base paper subjected to (i) contact thermal treatment with a heating roller set at 220° C. for 4.5 seconds or (ii) non-contact thermal treatment with a drier (oven) set at 190° C. for three minutes prepared in <Citric acid treatment> and <DMDHEU treatment> of <Example 3> described above. The amount of the applied processing liquid (the amount of the processing liquid applied by immersion) and the amount of the active ingredient (the amount of citric acid or DMDHEU) are as shown in Table 5.

<Alkali Treatment>

The citric acid-processed paper ((i) contact thermal treatment or (ii) non-contact thermal treatment) (5%, 10%, or 15% citric acid treatment) and DMDHEU-crosslinked base paper prepared through the aforementioned procedure were subjected to alkali treatment under the conditions described below.

(h) Immersed in 2% by mass aqueous potassium carbonate solution at ambient temperature (20° C.±5° C.) for 24 hours.

(j) Immersed in saturated aqueous calcium hydroxide solution at ambient temperature (20° C.±5° C.) for 24 hours. The alkali was rinsed off with water after the treatment.

<Measurement of Tensile Strength>

The tensile strengths (after water treatment) of the citric acid-processed paper (5%, 10%, or 15% citric acid treatment) and the DMDHEU-crosslinked base paper before the alkali treatment were measured through the aforementioned procedure.

The citric acid-processed paper (5%, 10%, or 15% citric acid treatment) and the DMDHEU-crosslinked base paper before the alkali treatment and after the alkali treatment (h) or (j) were subjected to burial treatment (two weeks or four weeks) through the aforementioned procedure. The tensile strengths of the papers were measured after the burial treatment, to thereby calculate burial treatment corrosion resistance indexes.

The results are shown in Table 8 (contact thermal treatment) and Table 9 (non-contact thermal treatment). The DMDHEU-crosslinked base papers and citric acid-crosslinked base papers subjected to the contact thermal treatment as shown in Table 8 were developed after the alkali treatment (h)/(j) and the burial treatment (two weeks or four weeks). The developed base papers can be observed in the photographs of FIGS. 1-1 to 2-4. The DMDHEU-crosslinked base papers and citric acid-crosslinked base papers subjected to the non-contact thermal treatment as shown in Table 9 were developed after the alkali treatment (h)/(j) and the burial treatment (two weeks or four weeks). The developed base papers can be observed in the photographs of FIGS. 3-1 to 4-4.

TABLE 8

Test results (contact thermal treatment)

| (Base paper 2: chemical fiber-mixed kraft pulp paper) | | | | Citric acid | | |
|---|---|---|---|---|---|---|
| | Contact thermal treatment | | DMDHEU | 5% | 10% | 15% |
| | Water treatment | Tensile strength [N/30 mm] | 67.5 ± 5.5 | 53.1 ± 5.0 | 59.8 ± 3.5 | 59.4 ± 3.6 |
| | | Burial treatment corrosion resistance index | 100 | 100 | 100 | 100 |
| Burial treatment | Two weeks | Tensile strength [N/30 mm] | 64.7 ± 2.4 | 32.7 ± 3.8 | 56.2 ± 7.8 | 57.7 ± 6.1 |
| | | Burial treatment corrosion resistance index | 96 | 52 | 90 | 97 |
| | Four weeks | Tensile strength [N/30 mm] | 59.7 ± 2.1 | 15.9 ± 0.9 | 46.7 ± 5.9 | 56.9 ± 2.3 |
| | | Burial treatment corrosion resistance index | 88 | 25 | 75 | 96 |
| Alkali treatment (h) + burial treatment | Two weeks | Tensile strength [N/30 mm] | 65.7 ± 8.6 | Not measured Degradation | Not measured Degradation | 9.4 ± 6.2 |
| | | Burial treatment corrosion resistance index | 97 | | | 15 |
| | Four weeks | Tensile strength [N/30 mm] | 50.7 ± 3.4 | Not measured Degradation | Not measured Degradation | 5.7 ± 0.8 |
| | | Burial treatment corrosion resistance index | 75 | | | 9 |
| Alkali treatment (j) + burial treatment | Two weeks | Tensile strength [N/30 mm] | 53.3 ± 5.9 | Not measured Degradation | Not measured Degradation | Not measured Degradation |
| | | Burial treatment corrosion resistance index | 79 | | | |
| | Four weeks | Tensile strength [N/30 mm] | 45.9 ± 3.0 | Not measured Degradation | Not measured Degradation | Not measured Degradation |
| | | Burial treatment corrosion resistance index | 68 | | | |

*Alkali treatment (h): immersed in 2% by mass aqueous potassium carbonate solution at ambient temperature (20° C. ± 5° C.) for 24 hours.
Alkali treatment (j): immersed in saturated aqueous calcium hydroxide solution at ambient temperature (20° C. ± 5° C.) for 24 hours.

TABLE 9

Test results (non-contact thermal treatment)

| (Base paper 2: chemical fiber-mixed kraft pulp paper) | | | | Citric acid | | |
|---|---|---|---|---|---|---|
| | Non-contact thermal treatment | | DMDHEU | 5% | 10% | 15% |
| | Water treatment | Tensile strength [N/30 mm] | 62.7 ± 4.6 | 65.4 ± 4.6 | 67.7 ± 8.1 | 64.6 ± 4.5 |
| | | Burial treatment corrosion resistance index | 100 | 100 | 100 | 100 |
| Burial treatment | Two weeks | Tensile strength [N/30 mm] | 57.0 ± 3.4 | 57.7 ± 6.2 | 65.5 ± 8.3 | 64.1 ± 6.0 |
| | | Burial treatment corrosion resistance index | 91 | 88 | 97 | 99 |
| | Four weeks | Tensile strength [N/30 mm] | 58.9 ± 4.4 | 37.1 ± 6.2 | 67.1 ± 3.1 | 65.0 ± 5.0 |
| | | Burial treatment corrosion resistance index | 94 | 57 | 99 | 101 |
| Alkali treatment (h) + burial treatment | Two weeks | Tensile strength [N/30 mm] | 58.2 ± 5.7 | 8.3 ± 7.6 | 22.6 ± 8.5 | 46.8 ± 3.2 |
| | | Burial treatment corrosion resistance index | 93 | 13 | 33 | 72 |
| | Four weeks | Tensile strength [N/30 mm] | 41.3 ± 5.7 | 5.2 ± 2.6 | 12.8 ± 0.3 | 44.0 ± 4.3 |
| | | Burial treatment corrosion resistance index | 66 | 8 | 19 | 68 |
| Alkali treatment (j) + burial treatment | Two weeks | Tensile strength [N/30 mm] | 58.8 ± 3.1 | Not measured Degradation | Not measured Degradation | Not measured Degradation |
| | | Burial treatment corrosion resistance index | 94 | | | |
| | Four weeks | Tensile strength [N/30 mm] | 29.4 ± 4.9 | Not measured Degradation | Not measured Degradation | Not measured Degradation |
| | | Burial treatment corrosion resistance index | 47 | | | |

*Alkali treatment (h): immersed in 2% by mass aqueous potassium carbonate solution at ambient temperature (20° C. ± 5° C.) for 24 hours.
Alkali treatment (j): immersed in saturated aqueous calcium hydroxide solution at ambient temperature (20° C. ± 5° C.) for 24 hours.

In the case of the contact thermal treatment shown in Table 8, regarding the citric acid-processed paper (10%) and the citric acid-processed paper (15%), the samples exhibited a corrosion resistance index of about 80% or more (i.e., sufficient corrosion resistance) two weeks and four weeks after the burial in the soil. Meanwhile, regarding the citric acid-processed paper (5%), the sample exhibited a certain level of tensile strength two weeks and four weeks after the burial in the soil, but the corrosion resistance index was lowered to 52 (two weeks after the burial) and 25 (four weeks after the burial), suggesting a low degree of citric acid crosslinking.

Regarding the citric acid-processed paper (15%), the sample subjected to the alkali treatment (h) and then the burial treatment maintained the form of paper even after the four-week burial treatment, but the corrosion resistance index was lowered to 15 (two weeks after the burial) and 9 (four weeks after the burial).

Regardless of the citric acid concentration, in all the samples subjected to the alkali treatment (j) and the burial treatment, degradation proceeded to such an extent as to fail to measure the tensile strength two weeks after the burial.

As clear from the photographs of the developed base papers of FIGS. 1-1 to 2-4, the states of the base papers corresponding to the tensile strengths shown in Table 8 were visually determined.

In the case of the non-contact thermal treatment shown in Table 9, regarding all the citric acid-processed paper (5%), the citric acid-processed paper (10%), and the citric acid-processed paper (15%) two weeks after the burial in the soil, and regarding the citric acid-processed paper (10%) and the citric acid-processed paper (15%) four weeks after the burial in the soil, the samples exhibited a corrosion resistance index of about 90% or more; i.e., sufficient corrosion resistance. Meanwhile, regarding the citric acid-processed paper (5%), the sample exhibited a certain level of tensile strength four weeks after the burial in the soil, but the corrosion resistance index was lowered to 57 (four weeks after the burial), suggesting a low degree of citric acid crosslinking.

Regarding all the citric acid-processed paper (5%), the citric acid-processed paper (10%), and the citric acid-processed paper (15%), the samples subjected to the alkali treatment (h) and then the burial treatment maintained the form of paper even after the two-week and four-week burial in the soil. However, regarding the citric acid-processed paper (5%) and the citric acid-processed paper (10%), the corrosion resistance index was lowered to less than 50 two weeks after the burial in the soil, suggesting a low degree of citric acid crosslinking.

Regardless of the citric acid concentration, in all the samples subjected to the alkali treatment (j) and the burial treatment, degradation proceeded to such an extent as to fail to measure the tensile strength two weeks after the burial.

As clear from the photographs of the developed base papers of FIGS. 3-1 to 4-4, the states of the base papers corresponding to the tensile strengths shown in Table 9 were visually determined.

These results suggested that, in the case of the contact thermal treatment, the citric acid-processed paper (treated with citric acid at a concentration of 10% or more) can be provided with a certain level of corrosion resistance, and in particular, the alkali treatment (j) (i.e., 24-hour immersion in saturated aqueous calcium hydroxide solution) can cause de-esterification in the citric acid crosslinking, to thereby impart degradability again to the corrosion resistance-provided base paper.

The results also suggested that, in the case of the non-contact thermal treatment, the citric acid-processed paper (treated with citric acid at a concentration of 5% or more) can be provided with a certain level of corrosion resistance, and in particular, the alkali treatment (j) (i.e., 24-hour immersion in saturated aqueous calcium hydroxide solution) can cause de-esterification in the citric acid crosslinking, to thereby impart degradability again to the corrosion resistance-provided base paper.

These results suggested that, also in the soil burial test, the degradation level of the citric acid-processed paper can be controlled by the type of the solution used for the alkali treatment, and that the strength of the citric acid crosslinking correlates with the ease of de-esterification.

The aforementioned results also indicated that the samples prepared through the non-contact thermal treatment exhibit higher post burial treatment tensile strength and a corrosion resistance index than the samples prepared through the contact thermal treatment, and exhibit corrosion resistance even after the alkali treatment (h) (i.e., 24-hour immersion in 2% by mass aqueous potassium carbonate solution), suggesting that the degradation of the citric acid-processed paper can also be controlled by the thermal treatment method.

As shown in Tables 8 and 9, regarding the DMDHEU-crosslinked base paper, the sample subjected to the two-week burial treatment and the samples subjected to the alkali treatments (h) and (j) and the two-week burial treatment exhibited a somewhat lower tensile strength than the sample subjected to only the water treatment, but exhibited a corrosion resistance index of about 80% or more; i.e., sufficient corrosion resistance. Thus, the difference in effect of promoting degradation due to the difference in alkali type or thermal treatment method was rarely determined in the DMDHEU-crosslinked base paper through the two-week burial test.

The sample subjected to the four-week burial treatment exhibited a somewhat lower tensile strength than the sample subjected to only the water treatment, but exhibited a corrosion resistance index of about 90%; i.e., sufficient corrosion resistance. Meanwhile, in the sample subjected to the alkali treatment (h) or (j) before the burial treatment, the tensile strength and corrosion resistance index after the four-week burial treatment were lower than those after the two-week burial treatment. The results indicated that the alkali treatment causes a slight effect in promoting degradation in the DMDHEU-crosslinked base paper.

<Example 5> Cultivation Test with Raising Seedling Pot

[Production of Base Paper and Pot]

As described in <Example 1> above, a DMDHEU-crosslinked base paper (concentration: 3.6% by mass, contact heating) was produced from base paper 1 by the DMDHEU treatment, and a 10% citric acid-crosslinked base paper (citric acid concentration: 10.0% by mass, Na hypophosphite concentration: 2.0% by mass, contact heating) was produced from base paper 1 by the citric acid treatment. Similarly, there were also produced a 5% citric acid-crosslinked base paper (citric acid concentration: 5.0% by mass, Na hypophosphite concentration: 1.0% by mass, contact heating) and a 15% citric acid-crosslinked base paper (citric acid concentration: 15.0% by mass, Na hypophosphite concentration: 3.0% by mass, contact heating).

As described in <Example 3> above, a DMDHEU-crosslinked base paper (concentration: 3.6% by mass, contact heating) was produced from base paper 2 by the DMDHEU treatment, and a 10% citric acid-crosslinked base paper (citric acid concentration: 10.0% by mass, Na hypophosphite concentration: 2.0% by mass, contact heating) was produced from base paper 2 by the citric acid treatment.

The thus-produced six types of base papers may be referred to as DMDHEU-crosslinked base paper (base paper 1), 5% citric acid-crosslinked base paper (base paper 1), 10% citric acid-crosslinked base paper (base paper 1), 15% citric acid-crosslinked base paper (base paper 1), DMDHEU-crosslinked base paper (base paper 2), and 10% citric acid-crosslinked base paper (base paper 2), respectively.

Raising seedling pots as shown in FIG. 5 were produced from these six base papers. Each raising seedling pot has no bottom and has a cylindrical shape allowing a high degree of freedom for downward elongation of roots.

[Cultivation Test]

Each of the raising seedling pots produced from the aforementioned six base papers was charged with Super Baido (available from Nippon Beet Sugar Manufacturing Co., Ltd.,), and komatsuna seeds were sown in the pot, followed by raising seedlings for three weeks. Thereafter, the resultant seedlings were transplanted into a planter containing a mixture of volcanic ash soil and Donai Negi Baido (available from Nippon Beet Sugar Manufacturing Co., Ltd.,) (2:1), followed by cultivation for three weeks (22 days). Before transplanting into the planter, the seedlings were divided into two groups; i.e., seedlings immersed in saturated aqueous calcium hydroxide solution for 16 hours (hereinafter referred to as "alkali treatment") and seedlings with non-alkali treatment. The effect of the alkali treatment on plant growth was evaluated by visual observation after the three-week (22-day) cultivation. Subsequently, the raising seedling pots were recovered and evaluated for the degree of degradation.

FIGS. 6 to 11 are photographs showing the growth condition of komatsuna seedlings raised in the raising seedling pots produced from the aforementioned six base papers, and the degradation condition of the pots.

Figure 6:
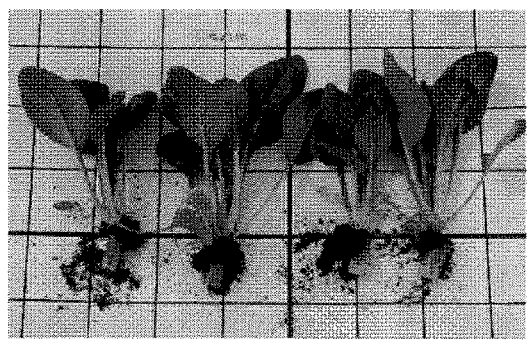
FIG. 6 is photographs showing the growth condition of komatsuna (Japanese mustard spinach) seedlings and the degradation condition of raising seedling pots in the case where komatsuna seeds were sown in raising seedling pots produced from a DMDHEU-crosslinked base paper (base paper 1), followed by raising seedlings for three weeks and non-alkali treatment (a) or alkali treatment (b), and then transplanting into a planter and cultivation for three weeks.
Figure 6:
Figure 7:
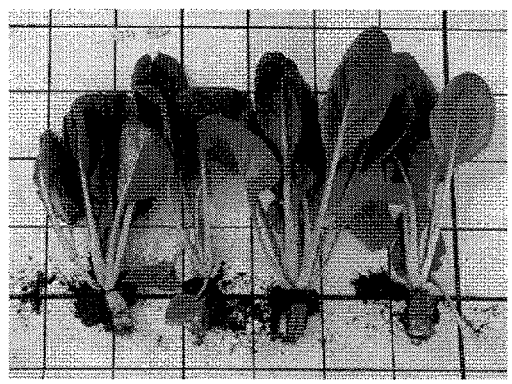
FIG. 7 is photographs showing the growth condition of komatsuna seedlings and the degradation condition of raising seedling pots in the case where komatsuna seeds were sown in raising seedling pots produced from a 5% citric acid-crosslinked base paper (base paper 1), followed by raising seedlings for three weeks and non-alkali treatment (a) or alkali treatment (b), and then transplanting into a planter and cultivation for three weeks.
Figure 7:
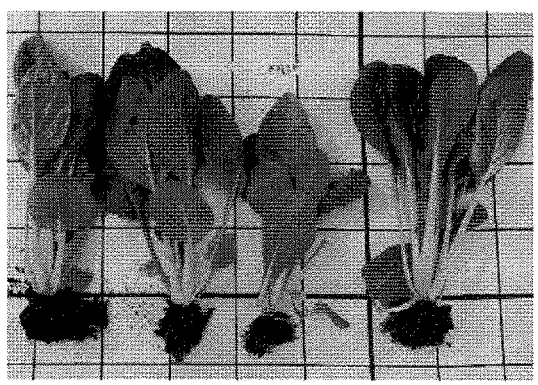
Figure 8:
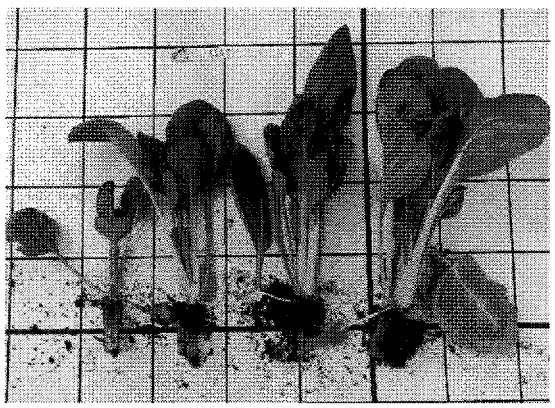
FIG. 8 is photographs showing the growth condition of komatsuna seedlings and the degradation condition of raising seedling pots in the case where komatsuna seeds were sown in raising seedling pots produced from a 10% citric acid-crosslinked base paper (base paper 1), followed by raising seedlings for three weeks and non-alkali treatment (a) or alkali treatment (b), and then transplanting into a planter and cultivation for three weeks.
Figure 8:
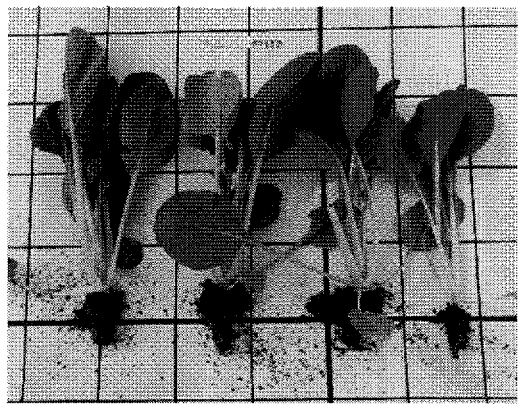
Figure 9:
FIG. 9 is photographs showing the growth condition of komatsuna seedlings and the degradation condition of raising seedling pots in the case where komatsuna seeds were sown in raising seedling pots produced from a 15% citric acid-crosslinked base paper (base paper 1), followed by raising seedlings for three weeks and non-alkali treatment (a) or alkali treatment (b), and then transplanting into a planter and cultivation for three weeks.
Figure 9:
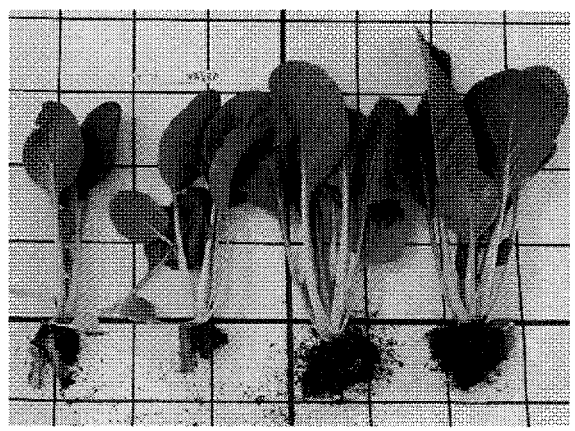
Figure 10:
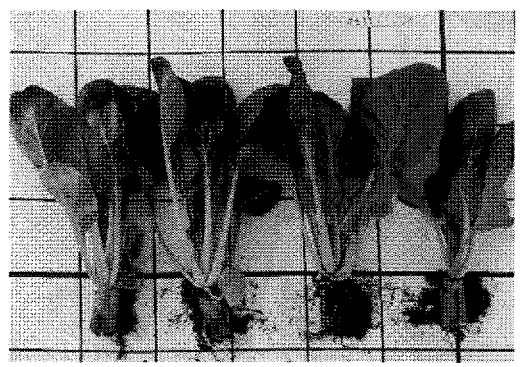
FIG. 10 is photographs showing the growth condition of komatsuna seedlings and the degradation condition of raising seedling pots in the case where komatsuna seeds were sown in raising seedling pots produced from a DMDHEU-crosslinked base paper (base paper 2), followed by raising seedlings for three weeks and non-alkali treatment (a) or alkali treatment (b), and then transplanting into a planter and cultivation for three weeks.
Figure 10:
Figure 11:
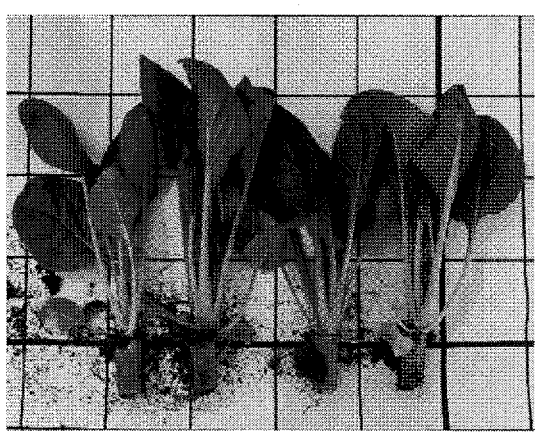
FIG. 11 is photographs showing the growth condition of komatsuna seedlings and the degradation condition of raising seedling pots in the case where komatsuna seeds were sown in raising seedling pots produced from a 10% citric acid-crosslinked base paper (base paper 2), followed by raising seedlings for three weeks and non-alkali treatment (a) or alkali treatment (b), and then transplanting into a planter and cultivation for three weeks.
Figure 11:

As clear from FIGS. 6 and 10, both the alkali-treated pots and the non-treated pots maintained the form of pot and showed no breakage, and no difference in appearance was observed. As clear from FIGS. 7, 8, 9, and 11, the alkali-treated raising seedling pots were almost degraded, and the non-treated raising seedling pots maintained the form of pot and showed no breakage. As clear from FIGS. 6 to 11, the effect of the alkali treatment on plant growth was not determined.

The invention claimed is:

1. A method for controlling initiation of biodegradation of a base paper for a raising seedling pot or a base paper for an agricultural paper mulch sheet made from a corrosion-resistant paper, by which the method allows compatibility between corrosion resistance and easy degradability of the base paper, the method comprising a step of alkali treatment of the corrosion-resistant paper with solution having pH 9 or more so as to provide easy degradability, wherein the corrosion-resistant paper contains a cellulose fiber-containing paper and a carboxylic acid crosslinking agent;

the cellulose fiber is at least partially bonded to the carboxylic acid crosslinking agent;

the carboxylic acid crosslinking agent is contained in an amount of 5.0 to 20.0% by mass relative to a dry mass of the cellulose fiber-containing paper; and an enzyme corrosion resistance index derived from a formula of [tensile strength (enzyme treatment)/tensile strength (water treatment)]×100 is 75 or more, where the tensile strength (enzyme treatment) is measured by which a test sample of the corrosion-resistant paper is continuously treated for 72 hours at 45° C. in an incubator containing an enzyme liquid prepared so as to arrange cellulase at a concentration of 1% with pH of 5.0, the test sample then washed with water and measured by a method according to JIS P8113:1998 "Paper and board—Determination of tensile properties—Part 2: Constant rate of elongation method," and the tensile strength (water treatment) is measured by which a test sample of the corrosion-resistant paper is immersed in water having 20° C.±5° C. at room temperature for 24 hours and measured by the method according to JIS P8113:1998.

2. The method according to claim 1, wherein the alkali treatment is performed with at least one basic substance selected from the group consisting of sodium hydroxide, potassium hydroxide, calcium hydroxide, sodium hydrogen carbonate, sodium carbonate, potassium carbonate, calcium carbonate, lithium hydroxide, rubidium hydroxide, cesium hydroxide, tetramethylammonium hydroxide, tetraethylammonium hydroxide, strontium hydroxide, barium hydroxide, europium hydroxide, thallium hydroxide, diamminesilver (I) hydroxide, tetraamminecopper (II) hydroxide, trimethylsulfonium hydroxide, diphenyliodonium hydroxide, ammonium carbonate, barium carbonate, magnesium carbonate, lithium carbonate, silver (I) carbonate, iron (II) carbonate, copper (II) carbonate, quicklime, calcium silicate, magnesia lime, calcium sulfate, and lime nitrogen, or alkaline electrolyzed water.

3. The method according to claim 1, wherein the carboxylic acid crosslinking agent is at least one compound selected from the group consisting of dicarboxylic acids, polycarboxylic acids, and salts of these.

4. The method according to claim 1, wherein the carboxylic acid crosslinking agent is at least one compound selected from the group consisting of citric acid, butanetetracarboxylic acid, iminodisuccinic acid, maleic acid, fumaric acid, oxalic acid, malonic acid, succinic acid, adipic acid, and salts of these.

5. The method according to claim 1, wherein the corrosion-resistant paper further contains at least one crosslinking catalyst selected from the group consisting of sodium hypophosphite, potassium hypophosphite, and disodium hydrogenphosphate.

6. The method according to claim 5, wherein the crosslinking catalyst is contained in an amount of 0.1 to 30% by mass relative to the mass of the carboxylic acid crosslinking agent.

7. The method according to claim 1, wherein the corrosion-resistant paper is a base paper for a raising seedling pot.

8. The method according to claim 1, wherein the corrosion-resistant paper is a base paper for an agricultural paper mulch sheet.

* * * * *